(12) United States Patent
Satish et al.

(10) Patent No.: US 12,699,910 B2
(45) Date of Patent: Aug. 4, 2026

(54) EXPLAINABILITY FOR ARTIFICIAL INTELLIGENCE-BASED DECISIONS

(71) Applicant: Accenture Global Solutions Limited, Dublin (IE)

(72) Inventors: Aishwarya Satish, Santa Clara, CA (US); Anshuma Chandak, Mountain View, CA (US); Emmanuel Munguia Tapia, San Jose, CA (US); Molly Carrene Cho, San Jose, CA (US)

(73) Assignee: Accenture Global Solutions Limited, Dublin (IE)

( * ) Notice: Subject to any disclaimer, the term of this patent is extended or adjusted under 35 U.S.C. 154(b) by 873 days.

(21) Appl. No.: 17/823,357

(22) Filed: Aug. 30, 2022

(65) Prior Publication Data
US 2024/0070495 A1 Feb. 29, 2024

(51) Int. Cl.
*G06F 40/279* (2020.01)
*G06F 40/56* (2020.01)
*G06N 5/045* (2023.01)
*G06N 20/00* (2019.01)

(52) U.S. Cl.
CPC ............. *G06N 5/045* (2013.01); *G06F 40/56* (2020.01)

(58) Field of Classification Search
CPC ................................. G06N 5/045; G06F 40/56
See application file for complete search history.

(56) References Cited

U.S. PATENT DOCUMENTS

| | | | |
|---|---|---|---|
| 9,836,455 B2 | 12/2017 | Martens et al. | |
| 11,288,115 B1 * | 3/2022 | Katsis | G06F 11/0736 |
| 2020/0294231 A1 * | 9/2020 | Tosun | G06V 20/695 |
| 2020/0356882 A1 | 11/2020 | Antoine et al. | |
| 2021/0142253 A1 | 5/2021 | Cohen et al. | |
| 2023/0394799 A1 * | 12/2023 | Soulhi | G06V 10/776 |

OTHER PUBLICATIONS

Arya, Vijay, et al. "One explanation does not fit all: A toolkit and taxonomy of ai explainability techniques." arXiv preprint arXiv: 1909.03012 (2019). (Year: 2019).*

* cited by examiner

*Primary Examiner* — Abdullah Al Kawsar
*Assistant Examiner* — Gary Mac
(74) *Attorney, Agent, or Firm* — Seed Intellectual Property Law Group LLP

(57) ABSTRACT

The proposed systems and methods are directed to explainability-augmented AI systems. These systems are configured to automatically identify, based on one or more of metadata associated with labels assigned to sample data and responses to AI-system-related questionnaires, one or more reasons that support the decisions made by an AI model in response to user queries. The proposed systems apply natural language processing (NLP) to transform the explainability data (e.g., metadata and questionnaire data) to generate human reader-friendly output that summarizes the reasoning by which the AI system made a specific decision and offer transparency to the AI-decision-making process.

17 Claims, 12 Drawing Sheets

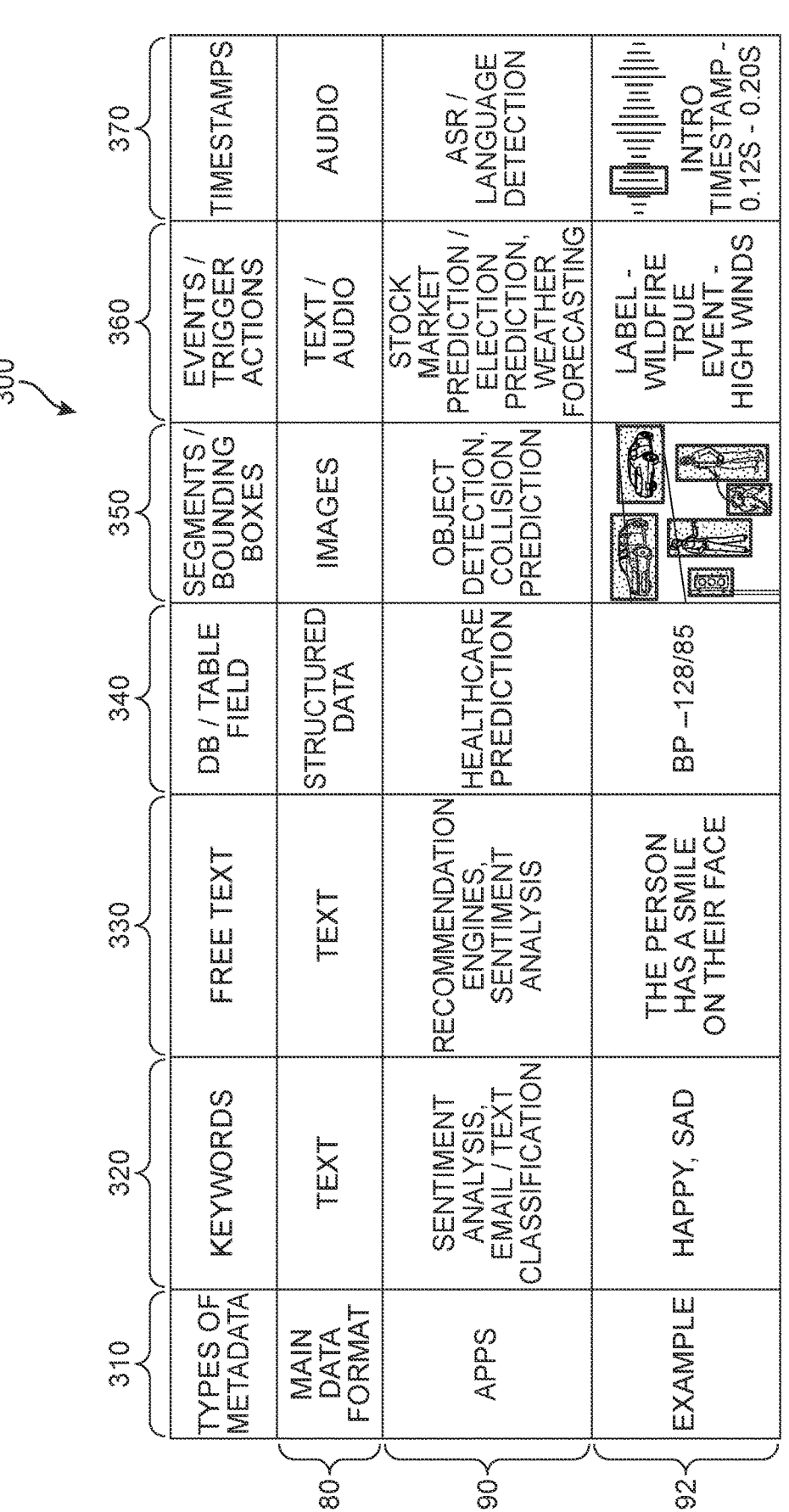

| TYPES OF METADATA | KEYWORDS 320 | FREE TEXT 330 | DB / TABLE FIELD 340 | SEGMENTS / BOUNDING BOXES 350 | EVENTS / TRIGGER ACTIONS 360 | TIMESTAMPS 370 |
|---|---|---|---|---|---|---|
| MAIN DATA FORMAT 380 | TEXT | TEXT | STRUCTURED DATA | IMAGES | TEXT / AUDIO | AUDIO |
| APPS 390 | SENTIMENT ANALYSIS, EMAIL / TEXT CLASSIFICATION | RECOMMENDATION ENGINES, SENTIMENT ANALYSIS | HEALTHCARE PREDICTION | OBJECT DETECTION, COLLISION PREDICTION | STOCK MARKET PREDICTION / ELECTION PREDICTION, WEATHER FORECASTING | ASR / LANGUAGE DETECTION |
| EXAMPLE 392 | HAPPY, SAD | THE PERSON HAS A SMILE ON THEIR FACE | BP –128/85 | | LABEL - WILDFIRE TRUE EVENT - HIGH WINDS | INTRO TIMESTAMP - 0.12S - 0.20S |

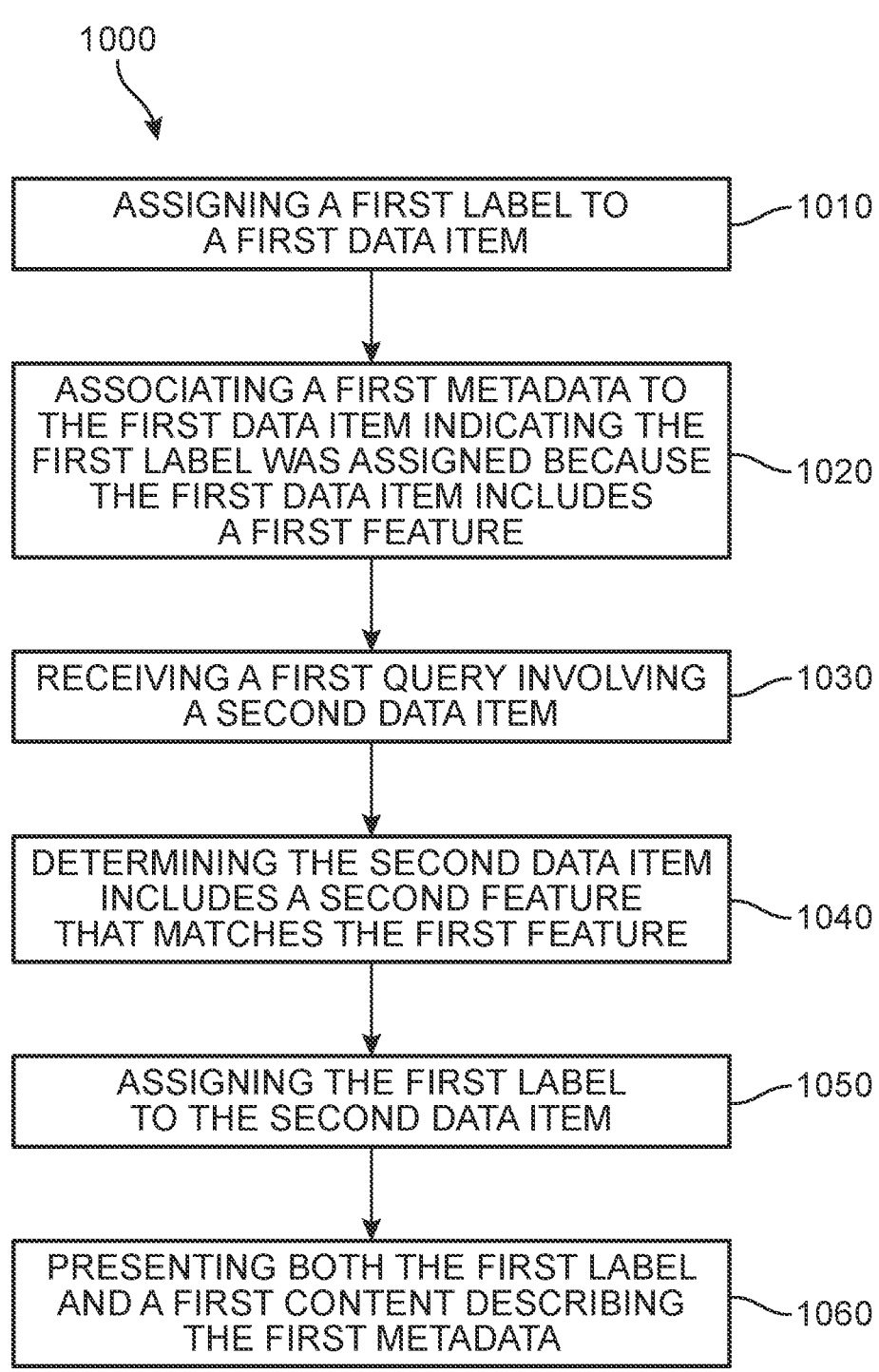

1000

ASSIGNING A FIRST LABEL TO
A FIRST DATA ITEM — 1010

ASSOCIATING A FIRST METADATA TO
THE FIRST DATA ITEM INDICATING THE
FIRST LABEL WAS ASSIGNED BECAUSE
THE FIRST DATA ITEM INCLUDES
A FIRST FEATURE — 1020

RECEIVING A FIRST QUERY INVOLVING
A SECOND DATA ITEM — 1030

DETERMINING THE SECOND DATA ITEM
INCLUDES A SECOND FEATURE
THAT MATCHES THE FIRST FEATURE — 1040

ASSIGNING THE FIRST LABEL
TO THE SECOND DATA ITEM — 1050

PRESENTING BOTH THE FIRST LABEL
AND A FIRST CONTENT DESCRIBING
THE FIRST METADATA — 1060

FIG. 10

EXPLAINABILITY FOR ARTIFICIAL INTELLIGENCE-BASED DECISIONS

TECHNICAL FIELD

The present disclosure generally relates to the field of explainability in artificial intelligence (AI) decision-making. More specifically, the present disclosure generally relates to the automatic identification of reasoning used in decisions made by AI models using metadata and questionnaire data.

BACKGROUND

Artificial intelligence, also referred to as AI, uses machine learning techniques at its core to allow machines to emulate certain core aspects of human behavior. In other words, AI allows machines to behave as autonomous systems that are capable of perceiving, learning, taking a decision, and taking an action with little or no human intervention.

The effectiveness of a responsible AI-based system, particularly when used for augmenting human intelligence, can be measured in terms of the system's ability to explain the decisions and actions to users. While in certain cases the user might agree with a certain action or a decision or altogether forego the need for an explanation from the machine, in most cases, the user may only appreciate or even accept a recommendation given by a machine if the machine is able to explain the logical steps and reasoning used to arrive at that recommendation.

For example, if the model recommends the user to undergo an invasive medical treatment, then the user may want visibility into the reasoning and intellect used for the recommendation because of the gravity of the situation. As another example related to finance or accounting scenarios, explanations and reasoning are necessary for recommendations for the chart of account code for a journal entry. In another example, in procurement, reasoning and explanations are necessary, for example, to explain the selection of vendors or the final bid. In yet another example, in policy-based content moderation, explanations and reasoning are required for rejected out-of-policy advertisements or social media postings. As another alternate example, in healthcare, explanations for denied claims are mandated as part of the explanation of benefits.

In another example, a conventional "black-box" AI system associated with an autonomous vehicle may determine a course of action that causes the autonomous vehicle to crash. However, the black-box AI system of the autonomous vehicle is not capable of explaining a reasoning that led to the determined course of action causing the crash. Accordingly, the person responsible for reviewing the crash details may consume considerable computing resources (e.g., processor resources, memory resources, and/or the like) and time attempting to identify a reasoning of the black-box AI system, troubleshoot the black-box AI system and/or the autonomous vehicle, adjust parameters of the black-box AI system, and/or the like.

These scenarios highlight a technical problem of conventional black-box AI systems in that they may be inefficient in providing an analysis of the solution that they offer. As such, the existing systems may utilize computational and manual resources, which may still lead to an insufficient and an ineffective result. Techniques for explainable AI, a term used herein for AI which is capable of offering an explanation for the decisions made by it, is therefore a desirable and necessary aspect of AI-model decision-making.

There is a need in the art for a system and method that addresses the shortcomings discussed above.

BRIEF DESCRIPTION OF THE DRAWINGS

The invention can be better understood with reference to the following drawings and description. The components in the figures are not necessarily to scale, emphasis instead being placed upon illustrating the principles of the invention. Moreover, in the figures, like reference numerals designate corresponding parts throughout the different views.

FIG. 3 is a table showing some examples of types of metadata that can be collected from annotators for use by the explainability components of the explainability-augmented AI system, according to an embodiment;

FIG. 5 is a schematic flow diagram presenting a process for expanding metadata from a first set of sample data items to a second set of sample data items, according to an embodiment;

FIG. 10 is a flow chart depicting a method for providing reasoning for decisions made by an artificial intelligence (AI) system, according to an embodiment.

SUMMARY

Figure 1:
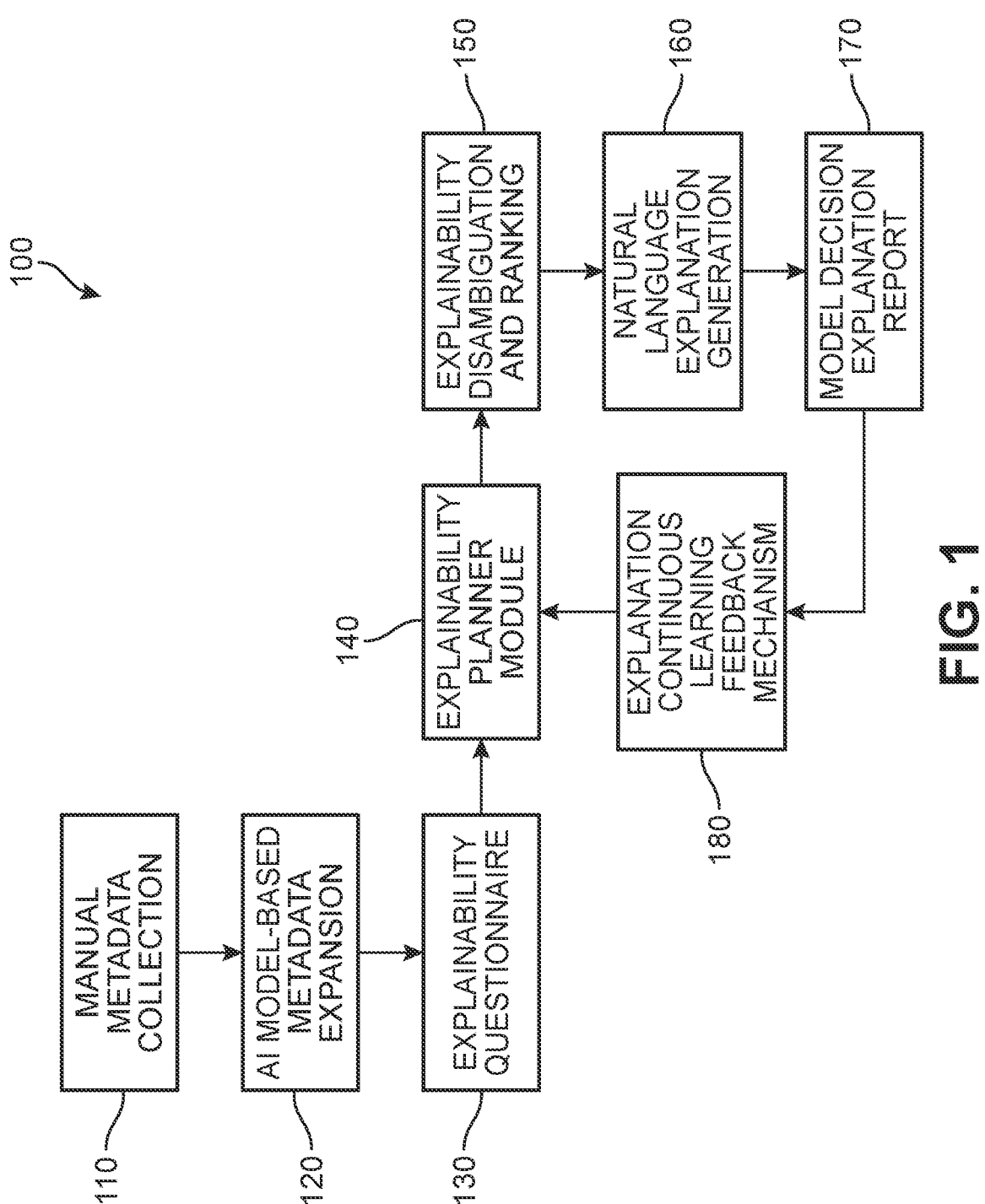
FIG. 1 is a schematic diagram of a high-level overview of an AI system for explainability, according to an embodiment.

Implementations described herein provide for augmentation of AI systems with explainability components. Explainable artificial intelligence (AI) can be programmed to describe a purpose, a rationale, and/or a decision-making process of the AI in a way that can be understood by a human. Explainable AI is in contrast to "black-box" AI, which is opaque, even to designers of the AI, as to why the AI arrived at a specific decision The disclosed explainability-augmented AI systems automatically identify, based on one or more of metadata associated with labels assigned to sample data and responses to AI-system-related questionnaires, one or more reasons that support the decisions made by an AI model in response to user queries. The proposed systems apply natural language processing (NLP) to transform the explainability data (e.g., metadata and questionnaire data) to generate human reader-friendly output that summarizes the reasoning by which the AI system made a specific decision. By incorporating explainability techniques and components into each stage of the AI system's lifecycle, highly accurate and relevant data regarding the decision-making process can be collected and conveyed to the human user.

In one aspect, the disclosure provides a computer-implemented method of providing reasoning for decisions made by an artificial intelligence (AI) system. A first step of the method includes assigning, at the AI system, a first label to a first data item of a plurality of data items, and a second step of associating, at the AI system, a first metadata to the first data item, the first metadata explaining the first label was assigned to the first data item because the first data item includes a first feature. A third step includes receiving, at the AI system, a first query involving a second data item, and a fourth step includes determining, at the AI system, the second data item includes a second feature that matches the first feature. In addition, the method includes a fifth step of assigning, at the AI system and in response to the second feature matching the first feature, the first label to the second data item, and a sixth step of presenting, by the AI system in response to the first query and via a display of a user device, both the first label and a first content describing the first metadata.

In another aspect, the disclosure provides a non-transitory computer-readable medium storing software comprising instructions executable by one or more computers which, upon such execution, cause the one or more computers to: (1) assign, at an artificial intelligence (AI) system, a first label to a first data item of a plurality of data items; (2) associate, at the AI system, a first metadata to the first data item, the first metadata explaining the first label was assigned to the first data item because the first data item includes a first feature; (3) receive, at the AI system, a first query involving a second data item; (4) determine, at the AI system, the second data item includes a second feature that matches the first feature; (5) assign, at the AI system and in response to the second feature matching the first feature, the first label to the second data item; and (6) present, by the AI system and in response to the first query, both the first label and a first content describing the first metadata.

In another aspect, the disclosure provides a system for providing reasoning for decisions made by an artificial intelligence (AI) system. The system comprises one or more computers and one or more storage devices storing instructions that are operable, when executed by the one or more computers, to cause the one or more computers to: (1) assign, at the AI system, a first label to a first data item of a plurality of data items; (2) associate, at the AI system, a first metadata to the first data item, the first metadata explaining the first label was assigned to the first data item because the first data item includes a first feature; (3) receive, at the AI system, a first query involving a second data item; (4) determine, at the AI system, the second data item includes a second feature that matches the first feature; (5) assign, at the AI system and in response to the second feature matching the first feature, the first label to the second data item; and (6) present, by the AI system and in response to the first query, both the first label and a first content describing the first metadata.

Other systems, methods, features, and advantages of the disclosure will be, or will become, apparent to one of ordinary skill in the art upon examination of the following figures and detailed description. It is intended that all such additional systems, methods, features, and advantages be included within this description and this summary, be within the scope of the disclosure, and be protected by the following claims.

While various embodiments are described, the description is intended to be exemplary, rather than limiting, and it will be apparent to those of ordinary skill in the art that many more embodiments and implementations are possible that are within the scope of the embodiments. Although many possible combinations of features are shown in the accompanying figures and discussed in this detailed description, many other combinations of the disclosed features are possible. Any feature or element of any embodiment may be used in combination with or substituted for any other feature or element in any other embodiment unless specifically restricted.

This disclosure includes and contemplates combinations with features and elements known to the average artisan in the art. The embodiments, features, and elements that have been disclosed may also be combined with any conventional features or elements to form a distinct invention as defined by the claims. Any feature or element of any embodiment may also be combined with features or elements from other inventions to form another distinct invention as defined by the claims. Therefore, it will be understood that any of the features shown and/or discussed in the present disclosure may be implemented singularly or in any suitable combination. Accordingly, the embodiments are not to be restricted except in light of the attached claims and their equivalents. Also, various modifications and changes may be made within the scope of the attached claims.

DESCRIPTION OF EMBODIMENTS

As noted above, conventional "black-box" AI systems (e.g., an artificial neural network) generate decisions (e.g., a prediction, a recommendation, and/or the like) using complex, multi-dimensional methods that typically cannot be interpreted by a human. Accordingly, a decision provided by a black-box AI system usually does not allow for ready examination by a human to determine reasons why the black-box AI system reached the decision.

Current AI systems typically rely on "vanilla" labeled data (e.g., datasets for Question Answering over Knowledge Graphs (KGQA)) to train AI models. Within the context of the current AI landscape, the capacity of an AI decision-making model to generate its reasoning for a decision is usually developed in the later stages of the AI development lifecycle. As a result, labeled data may often have missing metadata for its labels that can be treated as ground truth for training AI models—without providing an explanation behind the decisions that are being made by the trained model. However, it should be appreciated that the explainability performance of AI models represents a significant aspect of responsible AI, as it serves to provide reasoning and backing to the decisions made by the AI models in a human-readable way.

Furthermore, a decision outputted by a black-box AI system may represent a less trustworthy response due to its lack of transparency. For example, a user interacting with a black-box AI system that provides recommendations (e.g., hotel recommendations, movie recommendations, and/or the like) may attempt to steer the black-box AI system toward recommendations thought by the user to be more reliable. Accordingly, the user may make numerous queries to the black-box AI system with various combinations of keywords, filters, sorting techniques, and/or the like until a recommendation found suitable by the user is presented.

This wastes computing resources (e.g., processor resources, memory resources, and/or the like) and/or network resources that would otherwise be conserved if the user were to trust the recommendations of the black-box AI system or if the user were able to interact directly with a reasoning for the recommendations.

As will be described below, the proposed embodiments provide systems and methods whereby the metadata for the labeled data (e.g., reason for label, confidence value, etc.) that is collected and/or extracted at the time of annotation can be leveraged to build smart explainability components to reinforce and explain decisions made by AI models. In different embodiments, the proposed systems and methods integrate and incorporate explainability modelling processes through the entire AI development lifecycle. In some embodiments, the system is augmented with smart explainability components configured to leverage metadata for labeled data as well as questionnaire data about the AI model. The metadata and questionnaire data allow for a system that provides an end-to-end smart approach to providing human readable explainability into standard modeling pipelines for AI models and systems. In some embodiments, each smart explainability component can be configured to receive the extracted data generated by annotators during the labeling process, as well as questionnaire responses from the AI model owners, and in response output various explainability techniques that can analyze, disambiguate, and generate explanations and reasoning for decisions made by the main AI model. These processes can augment AI systems with a scalable, domain-agnostic layer of responsibility, as well as improve transparency and trust by consumers of AI models and systems.

For purposes of introduction, FIG. 1 depicts a high-level process 100 (or process 100) of a lifecycle integrating explainability into AI model decision-making. As will be described in greater detail below, the process 100 is configured to augment the entire AI development lifecycle, at every stage of development and testing, with explainability modelling processes. This approach allows for explainability to be integrated more comprehensively and provide better accuracy and enhance the overall AI lifecycle. In FIG. 1, the process 100 can be seen to include a first stage 110 including manual and/or automated metadata collection, followed by a second stage 120 of AI model-based metadata expansion during the annotation process. In other words, in different embodiments, at the time labeling is performed, metadata such as but not limited to the reason for the assigned label to a particular data item and the confidence for the label assignment is collected and/or extracted from the annotator. For purposes of this application, a data item is the target or reference content that is to be processed or evaluated by the AI system. Thus, a data item can refer to images, text, audio, videos, documents, and any other electronic or digital content. Data samples refer to the initial items that are given labels by the annotator(s) and/or used for training purposes by the AI system. In addition, in some embodiments, a semi-automated labeling algorithm can be applied to propagate the metadata to the other data samples that were labeled but did not have metadata, allowing low confidence samples to be combined into an ambiguous class. In some embodiments, a training manual can also be accessed to facilitate language understanding. This approach reduces the labeling/re-labeling effort, enriches training data for explainability, and results in a faster labeling process.

In a third stage 130, based on a given use-case or domain and/or questions answered by the project owner on how the explainability should be conveyed or communicated, the granularity and format of explainability will be configured. This step provides context and background that can allow for more discernment when selecting the most relevant explainability method. In a next, fourth stage 140, an explainability planner module will implement an explainability classifier, ontology builder, and nearest neighbors algorithms to establish a visual representation of the reasoning for various decisions. For example, weighted hierarchical ontology graphs and causal graphs can be built using the metadata, which can then be leveraged for visual representation, enabling scalability across a wide range of AI models. During a fifth stage 150, explainability disambiguation and ranking is performed to improve explainability relevance and accuracy, improving explainability relevance and accuracy. For example, depending on the type of AI model being built, there can be various methods of explainability and explainability components that can provide reasoning. In addition, by ranking and choosing the most accurate and relevant method for explainability, the system can provide the most human-readable and understandable explanation to the human end-user.

In a sixth stage 160, the process generates a natural language explanation. During this stage, the system translates the reasons that were relied on for its decision into a natural language explanation that improves human understanding and interpretation of the model decision. The decision and corresponding explanation are outputted as a report in a seventh stage 170. In addition, in different embodiments, there can be a mechanism for facilitating the process as a continuous learning framework cycle (eighth stage 180), improving explainability over time. Thus, feedback received (e.g., by the end-user or other subject matter expert) regarding the explanation that was generated can be fed back into the explainability model at the fourth stage 140, improving the relevancy and accuracy of reasoning that is produced during the next cycle.

Figure 2:
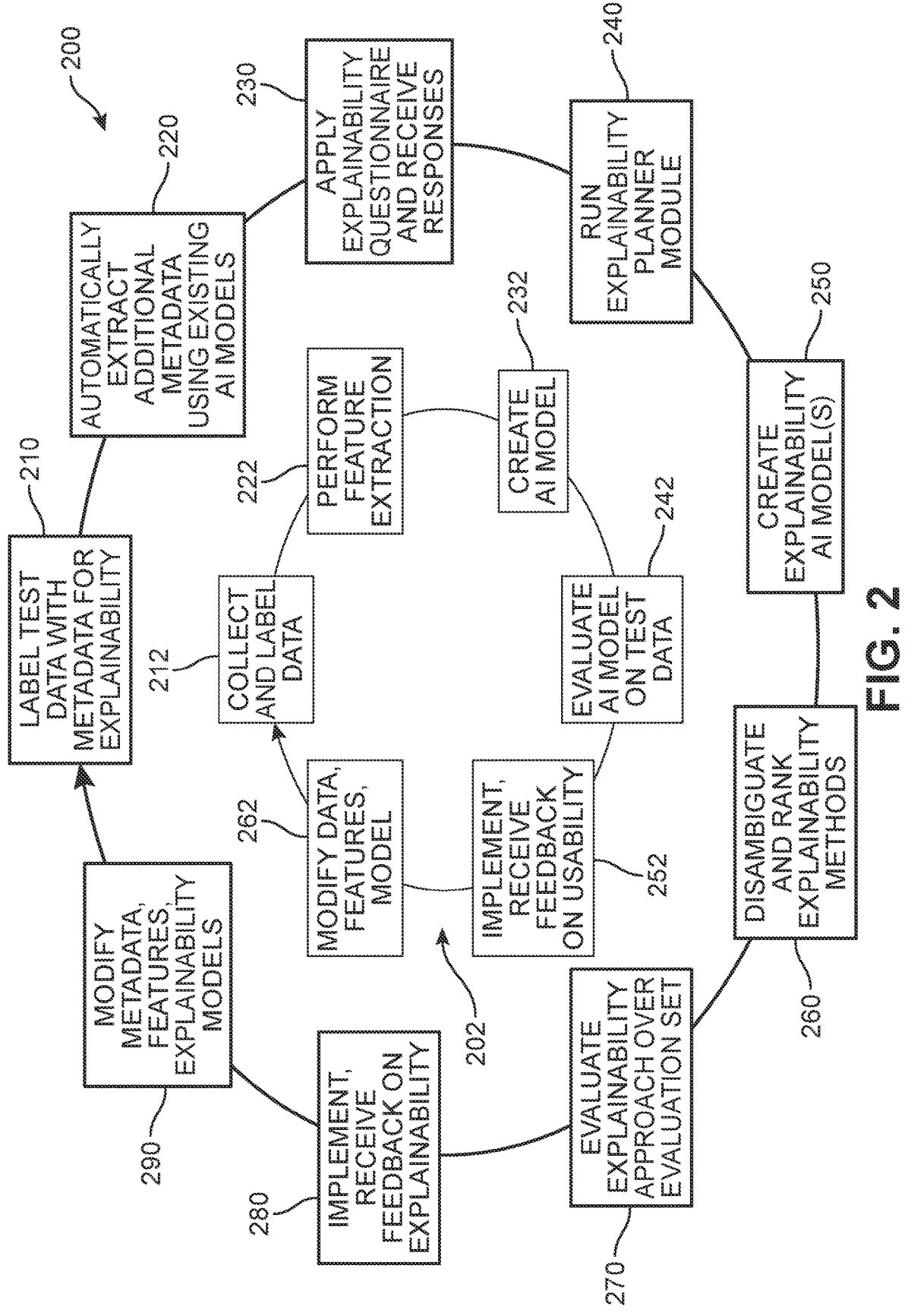
FIG. 2 is a schematic diagram of a standard AI system and an explainability-augmented AI system, according to an embodiment.

Referring now to FIG. 2, for purposes of comparison, a schematic diagram including two embodiments of an AI development lifecycles is shown—one representing a conventional or standard AI lifecycle 202 and one representing an augmented AI lifecycle 200 in which explainability has been integrated. As depicted in FIG. 2, the standard AI lifecycle 202 includes a first step 212 of collecting and labeling data, a second step 222 of performing feature extraction, a third step 232 of creating an AI model, a fourth step 242 of evaluating the AI model on test data, a fifth step 252 of receiving feedback on the model usability and implementing changes based on said feedback, and a sixth step 262 of modifying data and features of the model as needed.

In contrast, the augmented AI lifecycle 200 includes a more comprehensive approach that ensures each phase is performed within a backdrop of explainability. As shown in FIG. 2, the augmented AI lifecycle 200 includes a first phase 210 of labeling test data with metadata for explainability, and a second phase 220 of automatically extracting additional metadata using existing AI models. In a third phase 230, the explainability questionnaire is administered and responses received, and in a fourth phase 240, the explainability planner module is executed. Furthermore, in a fifth phase 250, one or more explainability AI models and methods are created, and in a sixth phase 260, each of the explainability AI methods are disambiguated and ranked. In a seventh phase 270, the explainability approach determined to represent the highest ranked and/or most relevant for the purposes of the desired AI model is evaluated with reference to an evaluation data set, and in an eighth phase 280, the new explainability method is implemented and feedback about the explainability output is received. Finally, in a ninth phase 290, the feedback is used to modify the metadata and features of the explainability models to ensure the next time the cycle is performed the improvements made are incorporated from the beginning.

For purposes of illustration, some examples of types of metadata that can be collected from the annotator(s) and used to develop explainability models as described herein are presented in a table 300 in FIG. 3. As a general matter, this metadata that will be collected will refer to information collected from the annotator in various forms that describes or explains or supports "why" a certain data sample was annotated with or otherwise classified under a given label.

In table 300, six non-limiting types of metadata ("metadata types") 310 are listed, including keywords 320, free text 330, database (DB) and/or table field(s) 340, segments and/or bounding boxes 350, events and/or trigger actions 360, and timestamps 370. For each of the metadata types 310, (a) main data format 380, (b) applications 390, and a (c) example 392 are also listed. In this table 300, keywords 320 can include (a) text, (b) sentiment analysis, and email/text classification, and (c) happy, sad; free text 330 includes (a) text, (b) recommendation engines, and sentiment analysis, and (c) the person has a smile on their face; DB and/or table field 340 includes (a) structured data, (b) healthcare prediction, and (c) BP-128/85; segments and/or bounding boxes 350 include (a) images, (b) object detection, collision prediction, and (c) an image in which bounding boxes are used to discriminate and identify objects such as persons, vehicles, and animals; events and/or trigger actions 360 include (a) text/audio, (b) stock market predictions, election predictions, weather forecasting, (c) label—wildlife true, event—high winds; and timestamps 370 includes (a) audio, (b) ASR (automatic speech recognition), language detection, and (c) waveform or signal analysis that detects timestamps added to audio data.

Thus, if the query is directed to automatically determining (using an AI model) whether a given data item such as an image includes children who are located "inside" or "outside", the annotator can, for a first image showing children running outside in a grassy field, identify the first image as "outside" and then also assign or supplement this label with metadata such as but not limited to swings, park, trees, etc., based on the image details. Subsequently, when a second image showing children seated on a floor in a classroom playing a game is entered into the AI model that was trained on the above annotator data and metadata, the AI model can determine that the image shows children who are "inside" and offer in support of its reasoning the terms "floor", "shelf", "bookcase".

Figure 4:
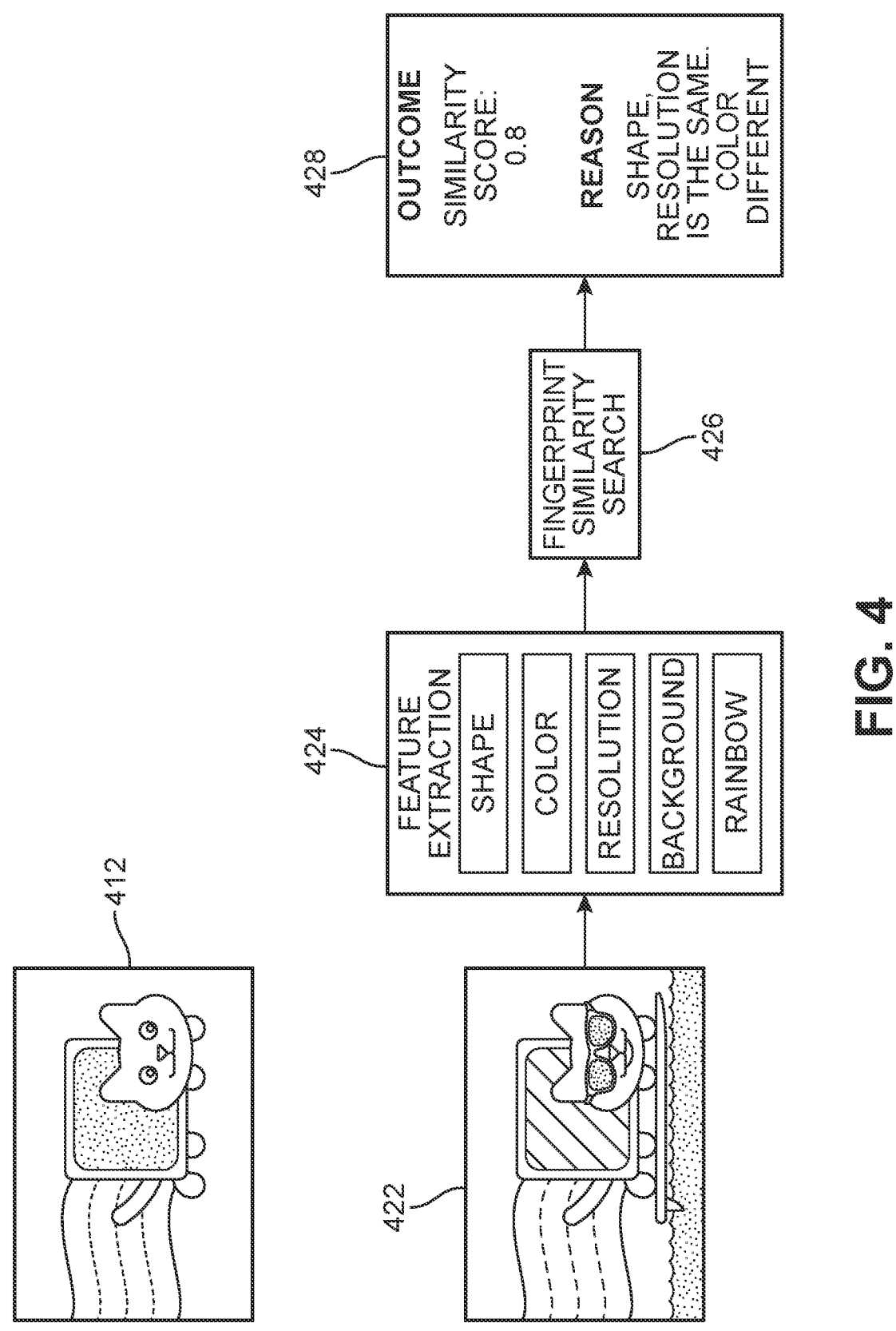
FIG. 4 is an example feature extraction process for similarity detection that has been augmented with an explainability output, according to an embodiment.

An example of an AI model that has been augmented to output decisions with reasons is depicted in FIG. 4. In FIG. 4 an AI model is requested to determine if one or more images are similar to a first NFT (non-fungible token) 412 (shown here as a representation of the Nyan Cat created by Chris Torres) or are images with inappropriate content to help moderate user-generated content. The AI model can apply a fingerprint similarity search, and in response to receiving an image for a second NFT 422, perform feature extraction 424 that identifies one or more of shape, color (e.g., of background), resolution, as well as object detection (e.g., rainbow, sun, water, background, cat head, cat tail, etc.) which is used to run a fingerprint similarity search 426. An example outcome 428 in this case indicates there is a 0.8 similarity score between the second NFT 422 and the first NFT 412, and the explainability module also generates reasons ("shape, resolution are the same; colors are different").

Figure 5:
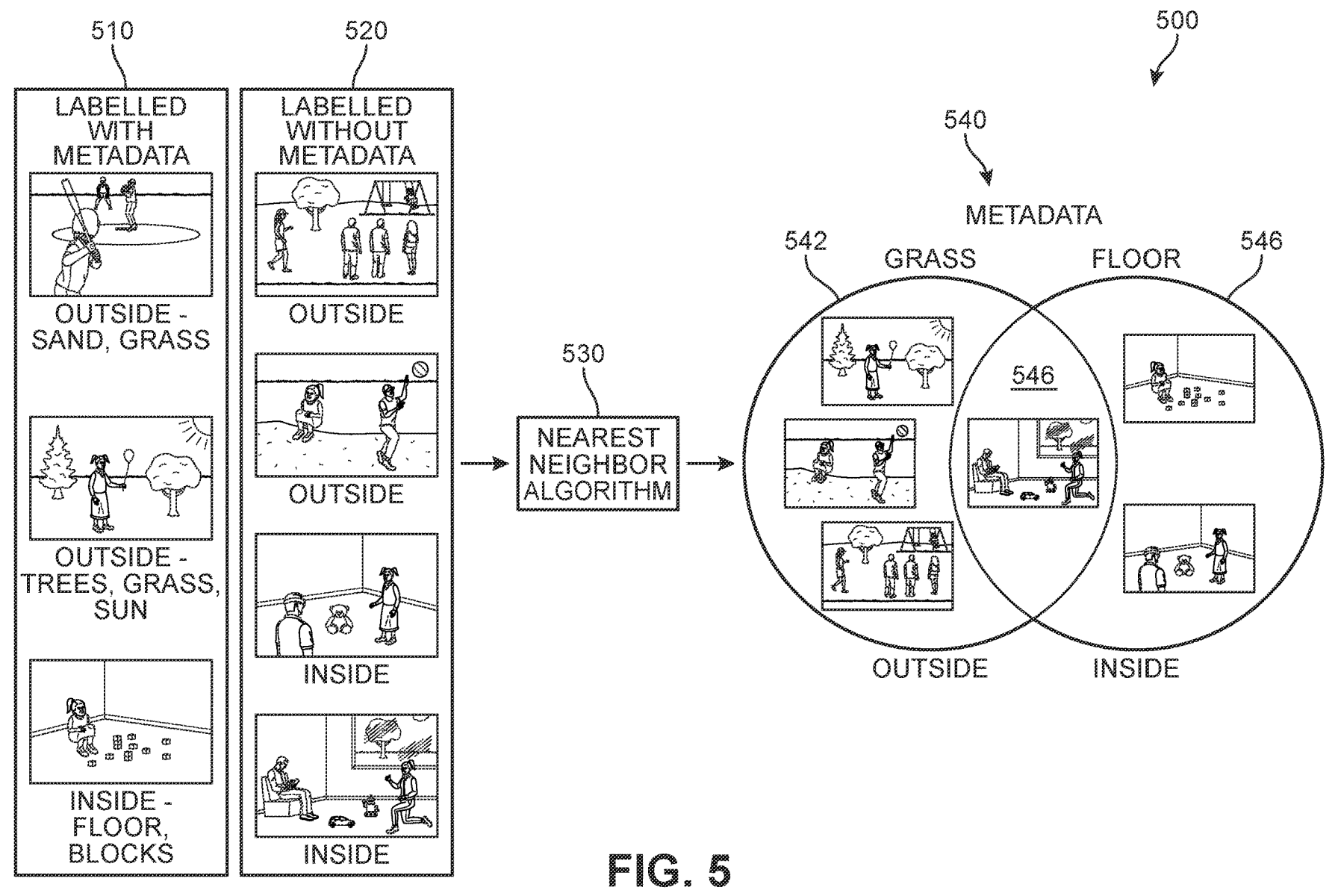

Moving next to FIG. 5, a schematic flow diagram illustrating metadata expansion 500 for an AI model is shown based on the query "Are the children playing outside or inside?". In different embodiments, when metadata is provided for some samples, a semi-supervised label propagation can be used to estimate and infer labels from the given samples. For example, in FIG. 5 a first dataset 510 including three labeled images accompanied by metadata (outside—sand, grass; outside—trees, grass, sun; inside—floor, blocks) and a second dataset 520 including four labeled images (outside; outside, inside, inside) without metadata are both inputted into a nearest neighbor algorithm 530, or other conventional local approximation method with classification and regression. In some embodiments, for each datapoint without metadata, a neighborhood search is performed and the metadata with the highest similarity (e.g., based on its Jaccard Index) is selected.

The nearest neighbor algorithm 530 then generates an output, shown here as a Venn diagram 540 for purposes of clarity for the reader. The Venn diagram 540 shows how the classification could be executed, as each image is determined to include either "grass" 542 or "floor" 544, which is the reasoning that can be used by the AI model to decide whether the images are of an outside environment or an inside environment. One image that includes both an inside environment (floor) and an outside environment (grass) straddles an overlapping segment 546 of the Venn diagram 540.

Figure 6:
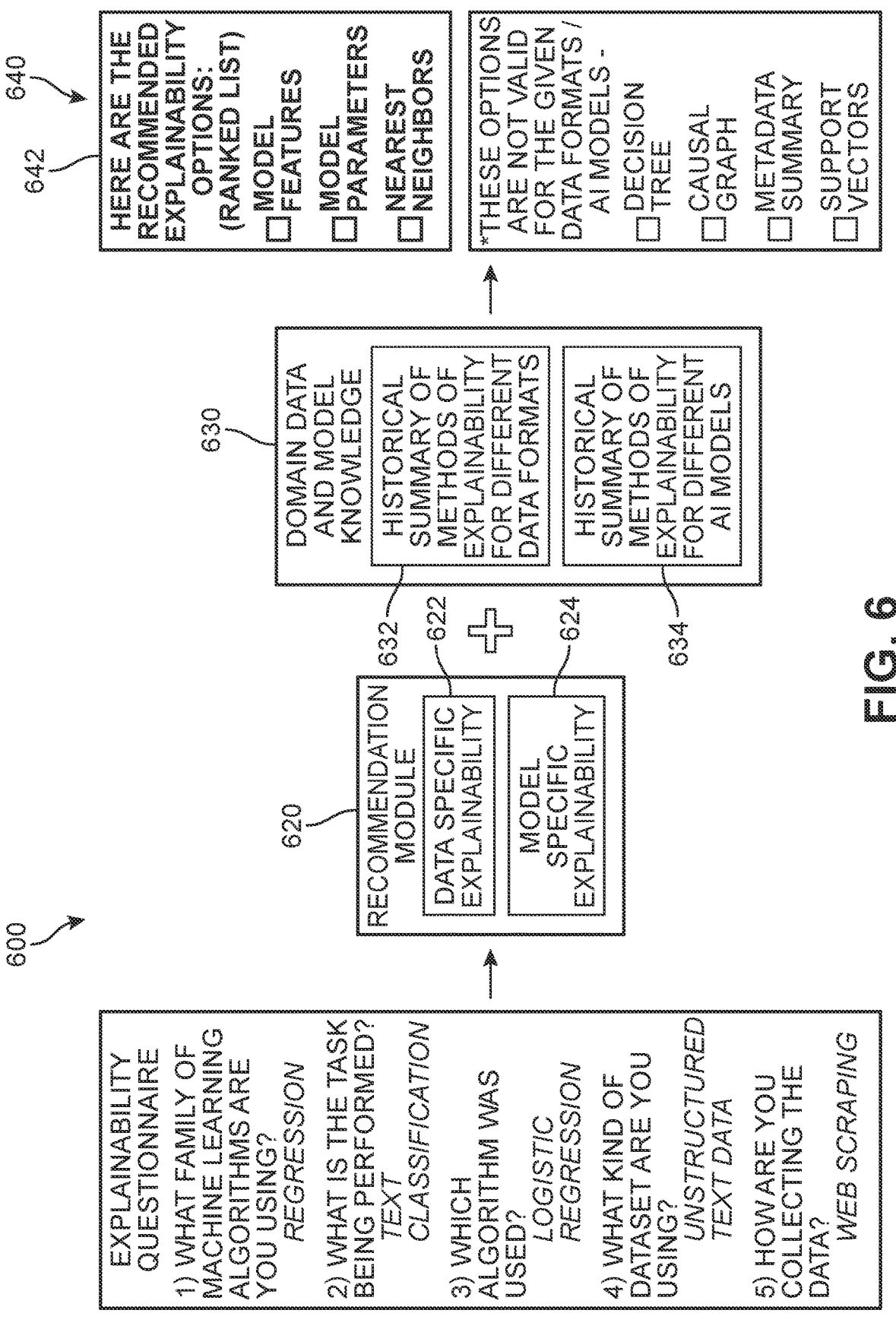
FIG. 6 is a schematic flow diagram presenting a process for integrating information from an explainability questionnaire into the selection of explainability options for an AI system, according to an embodiment.

As noted earlier, in different embodiments, explainability questionnaires will also be administered and/or data from questions about the model's performance will be received. For example, in FIG. 6, an example of the integration of such responses is presented. In one embodiment, an explainability questionnaire dataset 610 can include a series of questions and answers. For this example, the questions and answers are compiled as a dataset that includes the following: (1) what family of machine learning algorithms are you using? Classification; (2) What is the task being performed? Text classification; (3) What algorithm was used? Logistic regression; (4) What kind of dataset are you using? Unstructured text data; and (5) How are you collecting the data? Web scraping.

This explainability questionnaire dataset 610 is then received by a recommendation module 620, which can identify data-specific explainability aspects 622 based on representative data point(s) (Nearest Neighbors), decision trees, causal graphs, keywords, metadata summaries, etc. In addition, the recommendation module 620 can identify model-specific explainability aspects 624 based on model parameters, model coefficients, support vectors, and other features, etc. The explainability questionnaire dataset 610 is also shared with a domain data and model knowledge module 630, which can generate a historical summary of methods of explainability for different data formats 632 and/or a historical summary of methods of explainability for different AI methods 634. Together, the recommendation module 620 and the domain data and model knowledge module 630 can provide an output 640 whereby there is a selection/identification of one or more recommended explainability options 642 for the given AI model, listed in ranked order. In this case, the recommended explainability options 642 include model features, model parameters, and nearest neighbors. In some embodiments, the output 640 can further clarify the selection by also listing invalid options 644 that were not deemed valid for the given data formats or AI models (e.g., decision tree, causal graph, metadata summary, support vectors).

Figure 7:
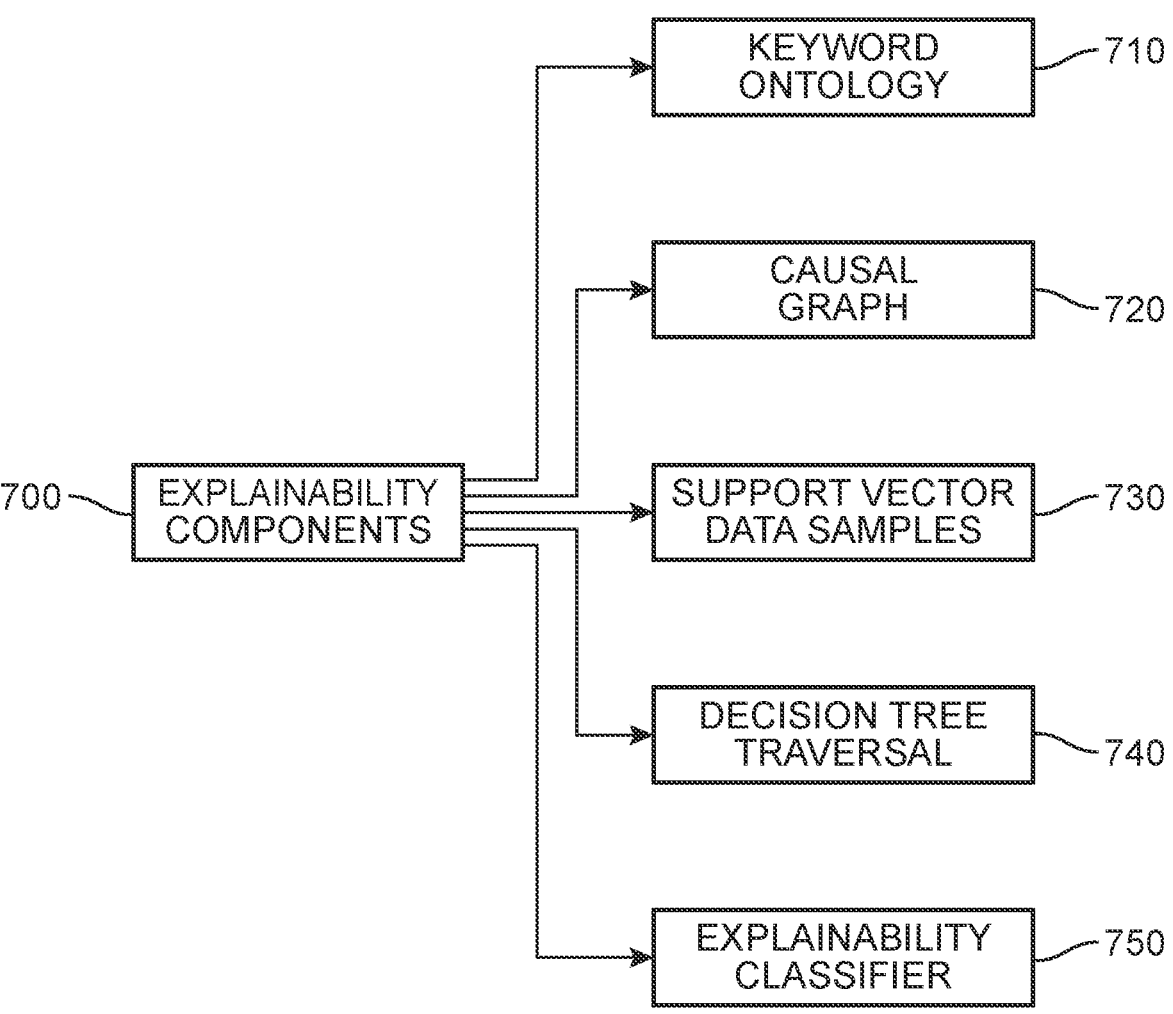
FIG. 7 is a schematic diagram presenting a set of explainability components, according to an embodiment.

FIG. 7 is a schematic diagram depicting some examples of explainability components 700 for reasoning identification in an AI model. In FIG. 7, the explainability components 700 include a keyword ontology 710, causal graph 720, support vector data samples 730, decision tree traversal 740, and explainability classifier 750. Details about each component are provided below.

The keyword ontology 710 can be understood to refer to an explainability component that is configured to produce a hierarchical graphical ordering of keywords to capture concepts at a granular level and generalize to a broader scope to provide higher confidence to the explainability model. In addition, the causal graph 720 refers to an explainability component that is configured to create event graphs that show causal relationships that improve the understanding of the decision-making context, particularly in cases where explainability for a decision is based on certain events or circumstances that trigger an action.

The support vector data samples 730 refer to support vectors for classification models that represent the most discriminative and representative data points that separate the different decisions made; in many cases, providing similar representative data points as part of the explanation (and their associated features) can provide useful data to the end-user. In addition, decision tree traversal 740 refers to the traversal of a data point through its most probable features, which can also represent the reasoning behind a certain decision. Finally, the explainability classifier 750 refers to an "Explainability Predicter" that functions as a multi-label machine learning model that is trained on metadata and configured to determine/identify the reasons for a prediction.

In different embodiments, the explainability components 700 can be arranged to evaluate inputs to the AI model and generate data for the explainability model. For example, for a given input statement "Terrible pitching and awful hitting led to another crushing loss", a machine learning (AI) model for sentiment analysis can determine the sentiment associated with the statement is negative. In a next step, an explainability predictor (one of the explainability components), trained on 'reasons' data for predicting the reasons for the predictive output of the AI model, can identify keywords that support the reasoning by the sentiment analysis AI model. For example, for the given input statement, the terms "terrible" and "awful" can be identified as supporting the "negative" sentiment decision and used to explain to the end-user (in natural language) how the model arrived at its decision. The explainability classifier can be further trained on reasons that SMEs provide that support their decisions in addition to the training manuals that are provided to the SMEs when performing annotation tasks.

As noted earlier with respect to FIG. 2, the creation of the explainability AI model can be followed by a disambiguation phase. In different embodiments, explainability can be inferred from different sources and methods for a given application. A disambiguation module to infer and select the best explainability strategy based on data obtained from various sources for a given application can allow for the identification of the most relevant and intelligible explanation. In some embodiments, the explainability components of FIG. 7, when applied to a question/answer from a questionnaire, can yield a ranking of possible options that should be implemented for explainability. For example, the question "What type of metadata are you collecting?" and answer "Free Text" can yield the following output shown in Table 1:

TABLE 1

| Ranking | Possible Options |
|---------|------------------|
| Lower | Nearest Neighbors |
| Higher | Decision Tree |
| Lower | Causal Graph |
| Higher | Keywords |
| Higher | Metadata Summary text |

Similarly, the question "What family of models are you using?" and answer "Random Forest Classifier" can yield the following output shown in Table 2:

TABLE 2

| Ranking | Possible Options |
|---------|------------------|
| Higher | Visualization (Decision Trees) |
| Lower | Examine Similar Communities |
| Higher | Feature Ranking |
| Lower | Examine Relevant Subgraphs |
| N/A | Class Activation Mapping |

In addition, in different embodiments, the recommendation module (see FIG. 6) implements a recommendation model that uses a weighted and/or exclusionary questionnaire to create a ranked list of explainability options for the user. Scores for data and model-based questions can be combined into a final recommendation ranking. In the case of data-specific explainability, the questionnaire can pose questions that pinpoint specifics associated with the type of metadata being collected. Options are then weighted higher, lower, or excluded altogether based on user answers. For example, based on the same question "What type of metadata are you collecting?" and the answer "Free Text", the recommendation module can also generate Table 1 as an output. Similarly, in the case of model-specific explainability, the questionnaire can include questions that are specific to the type of model and modeling choices that a user makes. Options are then weighted higher, lower, or excluded altogether based on user answers. For example, based on the same question "What family of models are you using?" and answer "Random Forest Classifier", the recommendation module can also generate Table 2 as an output.

Figure 8:
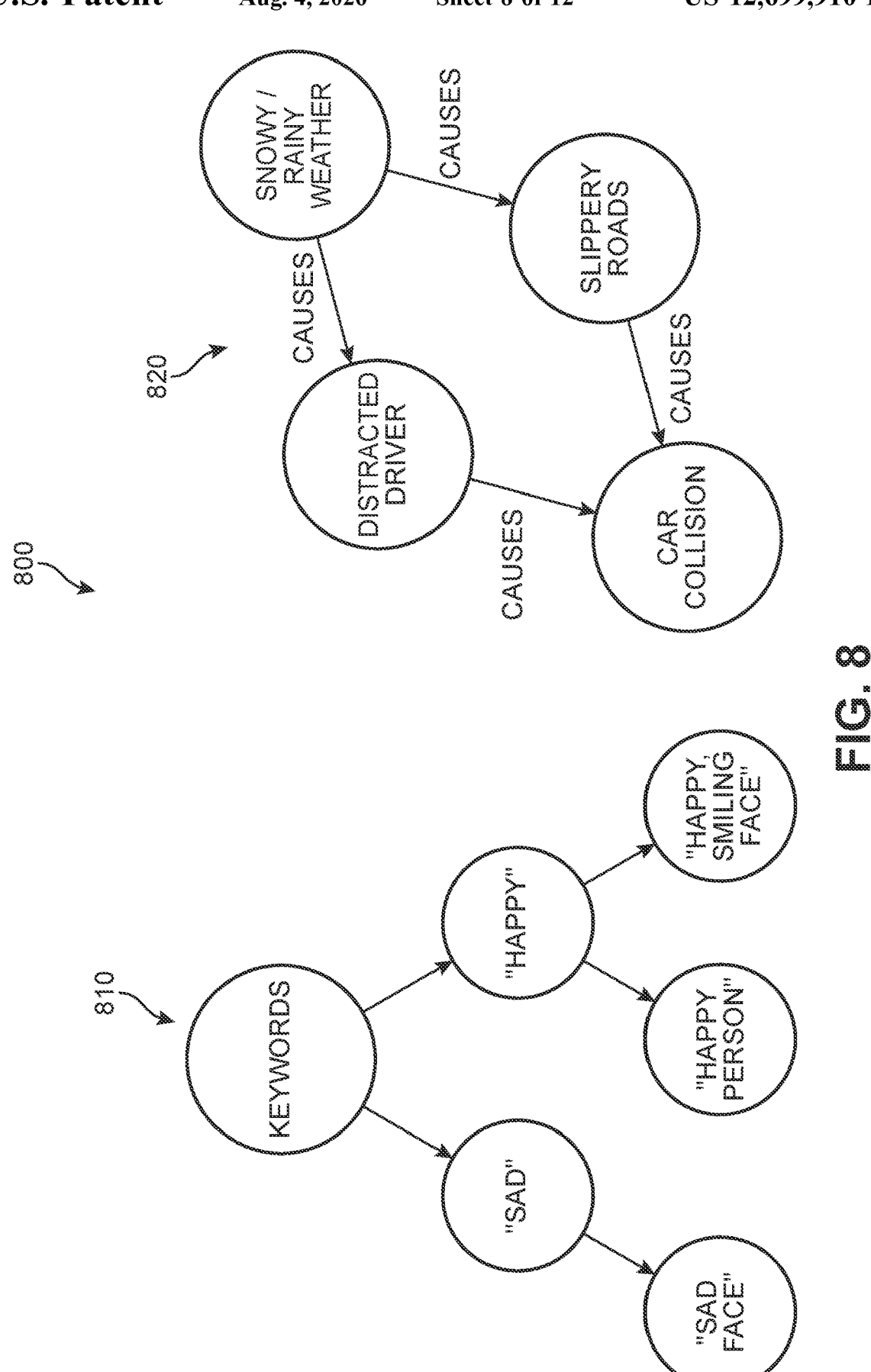
FIG. 8 shows two schematic diagrams for visual representation of weighted and causal relationships, according to an embodiment.

In order to better illustrate the benefit of visual representations for explainability, FIG. 8 shows two examples of data graphs 800 for visual representation, including a general data graph 810 and a causal data graph 820. For purposes of the general data graph 810, metadata can be generalized by topic, with weight relationships used to indicate the most likely reasoning for a particular label assignment. In this example, for a given statement, the general data graph 810 might identify keywords (node) such as "sad" (node) with a weight of 0.47 (edge) and "happy" (node) with a weight of 0.53 (edge). From the "sad" node, the mention of the two words together "sad face" (node) can be assigned a weight of 1.0 (edge), while the "happy" node extends to a weight of 0.25 (edge) for the set of words "happy person" (node) and a weight of 0.75 (edge) for the set of words "happy, smiling face".

For causal data, metadata can be organized instead based on cause and effect, and relationships can be weighted or non-weighted. As shown in causal data graph 820, a first node "snowy/rainy weather" can be identified as a cause of both a distracted driver and slipper roads. In addition, either or both of these two nodes can be the cause of a car collision.

Figure 9A:
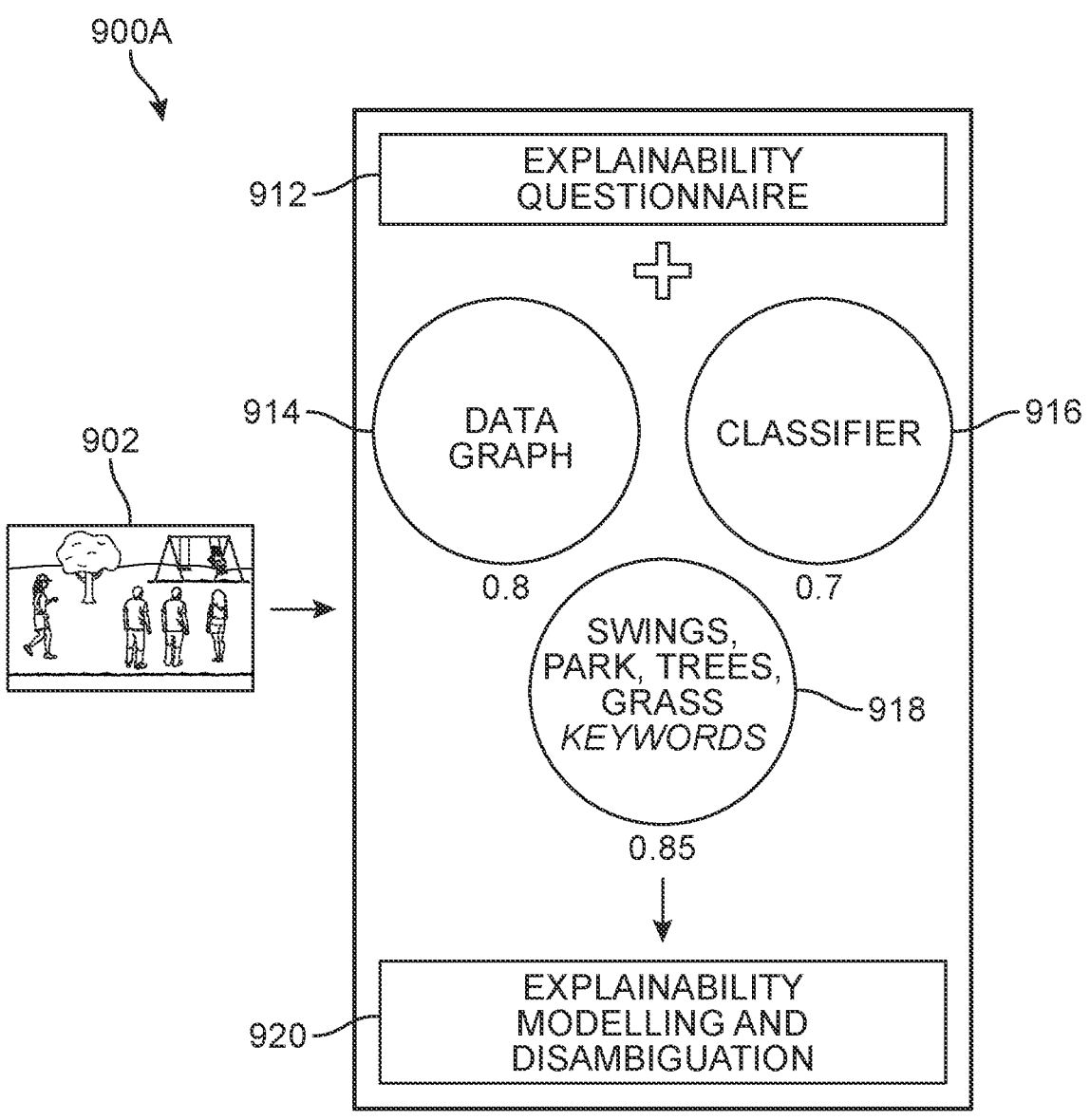
FIGS. 9A and 9B show a schematic flow diagram presenting a process for generating an explainability report, according to an embodiment.
Figure 9B:
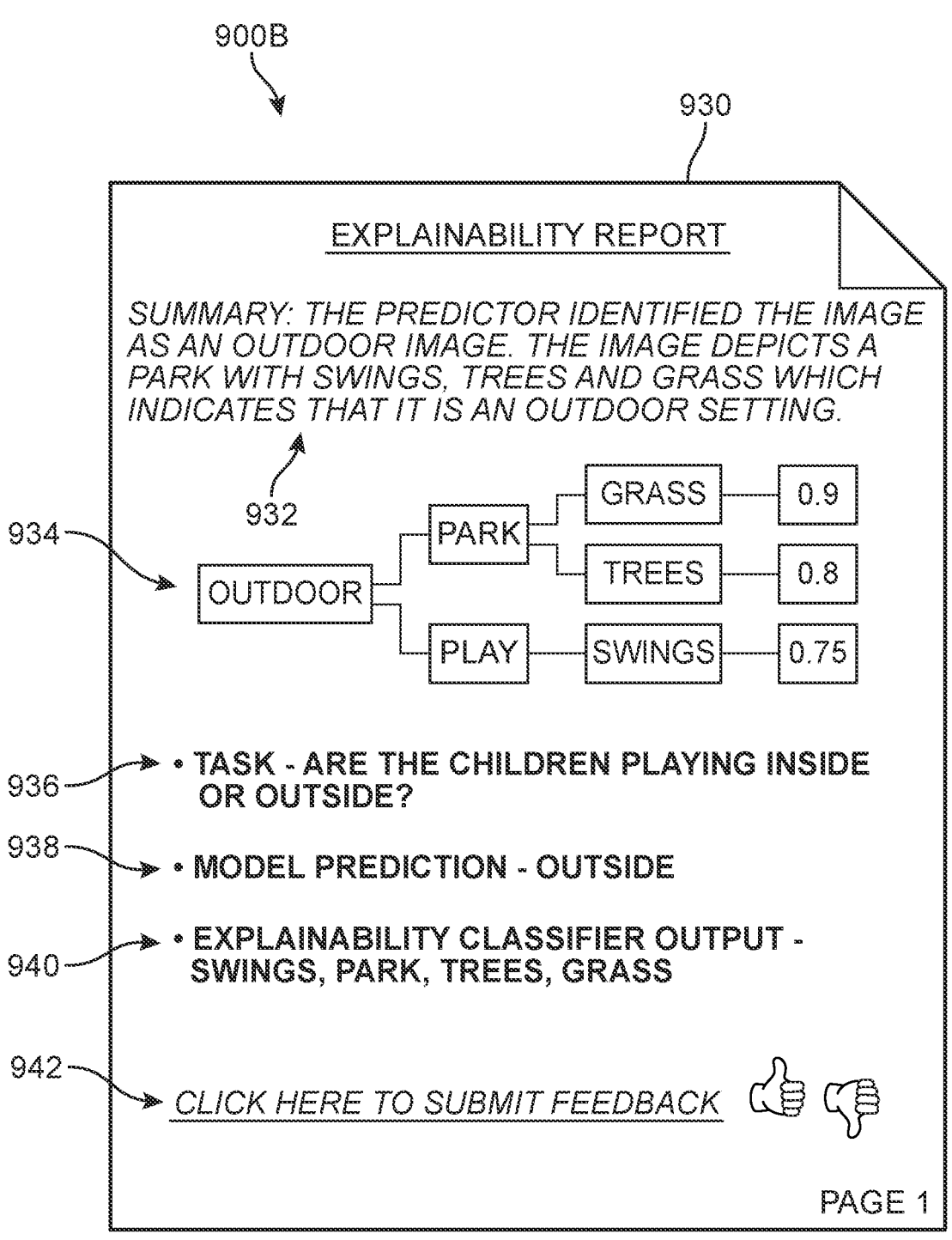

In different embodiments, as the AI lifecycle integrates the proposed explainability mechanisms, the system can be configured to generate a report that conveys the reasoning behind each decision that was made by the AI model. An example of this process (902A, 902B) is illustrated in FIGS. 9A and 9B, which ends with a user-interface-based output page. In FIG. 9A, an input image 902 is received by the system that is configured to perform some or all of explainability processes 910 described herein, including the collection of data for explainability questionnaire 912, data graphs 914, classifier 916, keywords identifier 918, leading to explainability modelling and disambiguation 920.

The system takes the outputs of these explainability processes 910 and generates a report. An example explainability report 930 is depicted in FIG. 9B. In this example, the explainability report 930 is a GUI that lists pertinent aspects of the AI model's decision, including its reasoning, and options for administrative users to validate the responses produced by a given AI-based question and answering system.

The explainability report 930 can include various items, including a summary 932 (e.g., "Summary: The predictor identified the image as an outdoor image. The image depicts a park with swings, trees, and grass which indicates that it is an outdoor setting.") as well as a graph 934 that includes the weights that were assigned to each keyword. Furthermore, the explainability report 930 reiterates task 936 ("Task—Are the children playing inside or outside?"), a simplified model prediction 938 ("Model prediction—outside"), and an explainability classifier output 940 ("swings, park, trees, grass").

As shown in FIG. 9B, the explainability report presents the explanation summary in natural language. In other words, based on the keywords identified (e.g., "outdoor", "park", "grass", "trees") using the AI model-based metadata expansion process (see FIG. 1), a natural language transformer is configured to generate a readable statement such as "A park with grass and trees." In some embodiments, the reasoning can serve as a justification that was selected in response to the metadata and domain-specific questionnaire documents for the answers that were provided to the end-users.

Furthermore, as discussed earlier with reference to FIG. 2, the proposed embodiments include a mechanism for continuous feedback 942 to provide for explainability performance improvement throughout the AI lifecycle. The feedback received by the end-user upon reviewing the explainability report, which can be as simple as a selection between "thumbs up" and "thumbs down" or "agree" and "disagree" can be used to significantly improve performance of the explainability model by continuous retraining of the model as needed. In some embodiments, the GUI providing the output/answers can include a link, which when selected by the user can display additional feedback options.

Artificial intelligence (AI) tools that are capable of deriving logical reasoning from the data that is processed by the artificial intelligence tools and use that logical reasoning to devise an explanation to present to the user are described herein. For example, AI-based question and answering systems can be configured to provide explainability so that users who administer the question answering system or other providers associated with the question answering system are able to access and understand the reasoning behind machine-generated responses. The techniques of the present disclosure involve a metadata-driven ontology with questionnaire responses to select optimal avenues by which to identify reasoning for each decision. The proposed embodiments can be used for developing an explainable AI technique to provide an effective manner of illustrating the behind-the-scenes' reasoning process of the AI system at a considerably granular level, which allows the user to make an informed decision or accept a decision made on behalf thereof. In addition, the explainable AI technique also provides a framework to empower the user in identifying possible errors or flaws in the reasoning, the exact step in the process where the errors occurred, and propose solutions and/or offer feedback in order to address those errors.

FIG. 10 is a flow chart illustrating an embodiment of a method 1000 for providing reasoning for decisions made by an artificial intelligence (AI) system. As shown in FIG. 10, a first step 1010 of the method 1000 includes assigning, at the AI system, a first label to a first data item of a plurality of data items, and a second step 1020 of associating, at the AI system, a first metadata to the first data item, the first metadata explaining the first label was assigned to the first data item because the first data item includes a first feature. A third step 1030 includes receiving, at the AI system, a first query involving a second data item, and a fourth step 1040 includes determining, at the AI system, the second data item includes a second feature that matches the first feature. In addition, the method 1000 includes a fifth step 1050 of assigning, at the AI system and in response to the second feature matching the first feature, the first label to the second data item, and a sixth step 1060 of presenting, by the AI system in response to the first query and via a display of a user device, both the first label and a first content describing the first metadata.

In other embodiments, the method may include additional steps or aspects. In another example, the method 1000 further includes steps of transforming, at the AI system, the first metadata to natural language, and generating, at the AI system, the first content using the natural language. In one example, the first metadata corresponds to a type of keyword, free text, bounding box, table, timestamp, and trigger action. In another example, the method further includes steps of receiving, at the AI system, a first response to a first question in a questionnaire, and selecting a first format for the first content based on the first response. In some embodiments, the method also includes steps of receiving, at the AI system, a first input identifying a use-case domain for the AI system, and configuring, at the AI system, a format and granularity of the first content based on the first input. In another example, the method includes steps of receiving, at the AI system, a first feedback in response to the presentation of the first label and the first content, and updating information linked with the first data item based on the first feedback. Furthermore, in some embodiments, the method includes a step of applying, at the AI system, a labeling algorithm to a third data item of the plurality of data items, thereby propagating the first metadata to additional test samples for the AI system.

Figure 11:
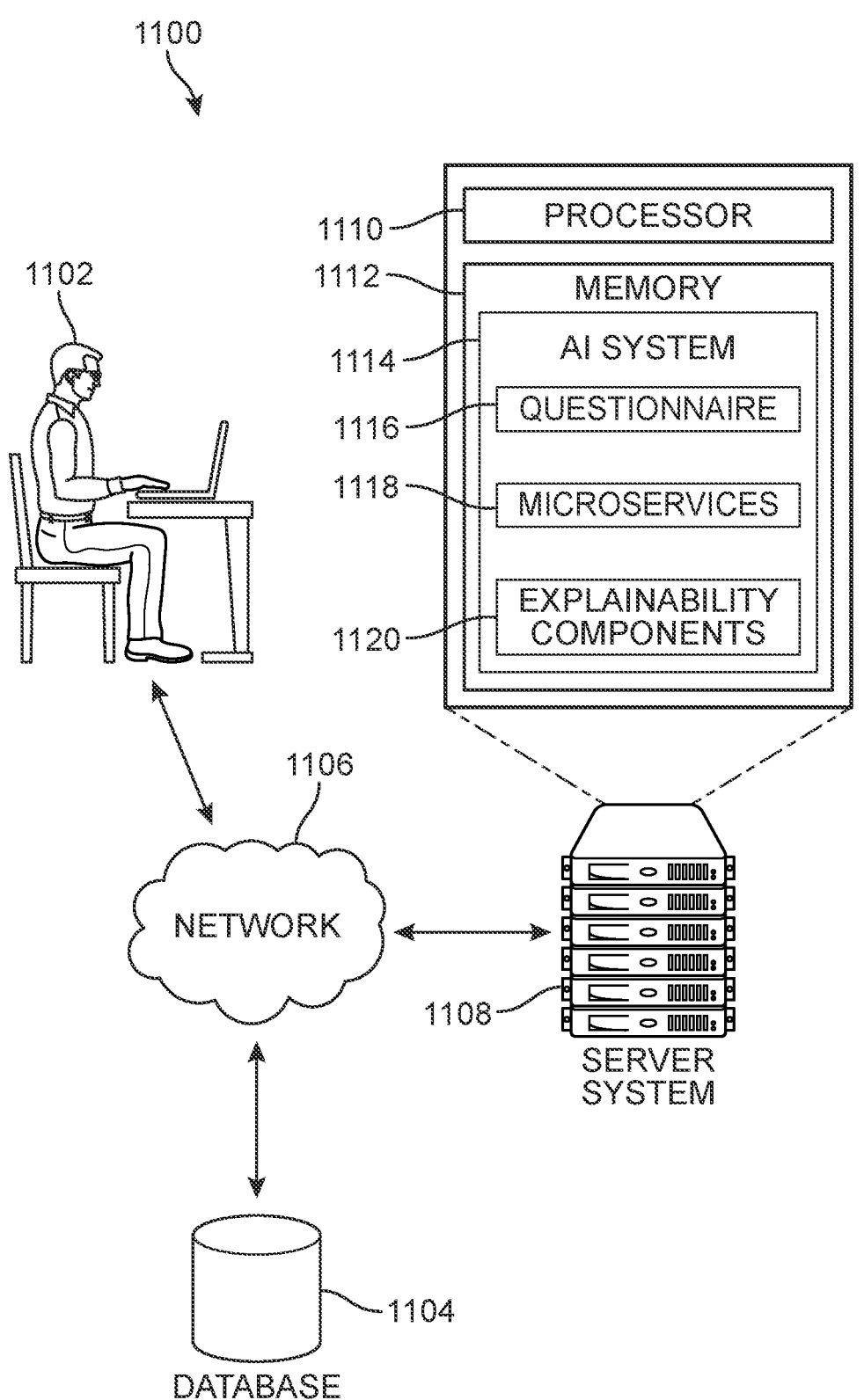
FIG. 11 is a diagram depicting example environments and components by which systems and/or methods, described herein, may be implemented.

FIG. 11 is a schematic diagram of an environment 1100 for an explainability-augmented AI system 1114 ("AI system" 1114), according to an embodiment. The environment 1100 may include a plurality of components capable of performing the disclosed methods. For example, environment 1100 includes a user device 1102, a computing/server system 1108, and a database 1104. The components of environment 1100 can communicate with each other through a network 1106. For example, user device 1102 may retrieve information from database 1104 via network 1106. In some embodiments, network 1106 may be a wide area network ("WAN"), e.g., the Internet. In other embodiments, network 1106 may be a local area network ("LAN").

As shown in FIG. 11, components of the AI system 1114 may be hosted in computing system 1108, which may have a memory 1112 and a processor 1110. Processor 1110 may include a single device processor located on a single device, or it may include multiple device processors located on one or more physical devices. Memory 1112 may include any type of storage, which may be physically located on one physical device, or on multiple physical devices. In some cases, computing system 1108 may comprise one or more servers that are used to host the system.

While FIG. 11 shows one user device, it is understood that one or more user devices may be used. For example, in some embodiments, the system may include two or three user devices. In some embodiments, the user device may be a computing device used by a user. For example, user device 1102 may include a smartphone or a tablet computer. In other examples, user device 1102 may include a laptop computer, a desktop computer, and/or another type of computing device. The user devices may be used for inputting, processing, and displaying information. Referring to FIG. 11, environment 1100 may further include database 1104, which stores test data, training data, annotations and/or other related data the explainability components and AI system as well as other external components. This data may be retrieved by other components for AI system 1114. As discussed above, AI system 1114 may include a questionnaire module 1116, metadata module 1118, and an array of explainability components 1120. Each of these components may be used to perform the operations described herein.

To provide further context, in some embodiments, some of the processes described herein can be understood to operate in a system architecture that can include a plurality of virtual local area network (VLAN) workstations at different locations that communicate with a main data center with dedicated virtual servers such as a web server for user interfaces, an app server for OCR and data processing, a database for data storage, etc. As a general matter, a virtual server is a type of virtual machine (VM) that is executed on a hardware component (e.g., server). In some examples, multiple VMs can be deployed on one or more servers.

In different embodiments, the system may be hosted at least in part in a cloud computing environment offering ready scalability and security. The cloud computing environment can include, for example, an environment that hosts the document processing management service. The cloud computing environment may provide computation, software, data access, storage, etc. services that do not require end-user knowledge of a physical location and configuration of system(s) and/or device(s) that hosts the policy management service. For example, a cloud computing environment may include a group of computing resources (referred to collectively as "computing resources" and individually as "computing resource"). It is contemplated that implementations of the present disclosure can be realized with appropriate cloud providers (e.g., AWS provided by Amazon™, GCP provided by Google™, Azure provided by Microsoft™, etc.).

In different embodiments, applications of the system are built and deployed by a software framework. A software framework is a universal, reusable software environment that provides particular functionality as part of a larger software platform to facilitate development of software applications. Software frameworks may include support programs, compilers, code libraries, tool sets, and application programming interfaces (APIs) that enable development of a software application. Some implementations can provide a user device and/or component management platform that is capable of facilitating the development of software applications through the use of a user interface designed to be simple to use, and re-usable software components (e.g., buttons, links, fields, graphics, and/or the like) that can be displayed in the user interface and generated in multiple different software frameworks and/or programming languages for a variety of platforms. For example, the component management platform may provide a first software application that includes a user interface through which a user can develop a second software application. The user may use features of the user interface to create software components that are displayed in the first software application (e.g., the UI) using a first programming language (e.g., hypertext markup language (HTML) or another programming language associated with the first software application) and generated in a first software framework (e.g., a software framework associated with the software application being developed). The user interface may include features, such as drag and drop operations for the creation of software components and selectable software component characteristics, to facilitate creation and customization of software components. In some implementations, the component management platform may store components that were previously generated by users, generate copies of software components in multiple software frameworks and/or for different platforms, and make software components available for users to include in software applications that are under development.

In this way, a user device and/or cloud server may facilitate the development of software applications in multiple software frameworks and for multiple platforms, without requiring special knowledge or repeated component development on the part of a user, and in a manner designed to be relatively quick and efficient. Special software framework knowledge and/or familiarity may not be required, for example, by using a user interface to enable the generation of software components in multiple software frameworks in a single integrated development environment, such as a web-based integrated development environment that is accessible from any device with a web browsing application browser. Some non-limiting examples of such frameworks include Microsoft.NET™, the EMC™ integrated development environment, the Microsoft™ Visual Studios integrated development environment for writing and debugging code, and the Eclipse™ integrated development environment for incorporation of open source code. Reusable software components may significantly increase the speed and efficiency of software development, including facilitating more efficient use of software developer time and computing resources (e.g., processor resources, memory resources, and/or the like). Some implementations may reduce network communications relative to a purely cloud-based application development solution, e.g., by enabling the user device to perform much of the functionality for component and software application development without the need to interact with a server computer over a network, which would introduce latency into the development process. Furthermore, some implementations described herein use a rigorous, computerized process to perform tasks or roles that were not previously performed. Also, automating the process for generating software components conserves computing resources (e.g., processor resources, memory resources, and/or the like) and time that would otherwise be wasted by using manual development processes for attempting to create multiple software components in multiple software frameworks.

In some embodiments, the software development application may be an application installed on and executed by the user device. In some implementations, the software development application may be a web-based application designed to execute a web application (e.g., an application operating on a server computer or the component management platform, and implemented in HTML, JavaScript, and/or the like). The software development application may be written in a variety of programming languages and provide a variety of different types of user interface elements, which may be used in the development of a new software component and/or another software application. In some embodiments, the software development application includes a component toolbox. The component toolbox may be presented via a user interface offering one or more interactable user interface elements, such as buttons, which are associated with software components. For example, the component toolbox may include one or more buttons for the generation of software components, such as input components (e.g., buttons, checkboxes, dropdown lists, toggle buttons, text fields, and/or the like), navigational components (e.g., search fields, sliders, pagination indicators, links, icons, and/or the like), informational components (e.g., tooltips, progress bars, message boxes, images, and/or the like), and/or the like. In some implementations, the component toolbox may include user interface elements that generate a software component based on a pre-existing software component (e.g., a previously created software component). In some implementations, the component toolbox may include a user interface element designed to enable the creation of a new software component, which may enable a user of the user device to define a new type of software component.

For purposes of this disclosure, the Application Programming Interfaces (APIs) may refer to computer code that supports application access to operating system functionality. A platform dependent API may be understood to rely on the functionality of a particular software platform. The platform dependent API may use device specific libraries or native code allowing access to the mobile device at a low level. The API can be configured to provide a wide range of visualization dashboards for document processing management, as will be discussed below.

It should be understood that the systems and/or methods as described herein may be implemented using different computing systems, components, modules, and connections. An end-user or administrator may access various interfaces provided or supported by the policy management service, for example, via one or more devices capable of receiving, generating, storing, processing, and/or providing information, such as information described herein. For example, a user device may include a mobile phone (e.g., a smart phone, a radiotelephone, etc.), a laptop computer, a tablet computer, a desktop computer, a handheld computer, a gaming device, a wearable communication device (e.g., a smart wristwatch, a pair of smart eyeglasses, etc.), or a similar type of device. In some implementations, user device may receive information from and/or transmit information to the policy management service platform. For example, a device may include a bus, a processor, a memory, a storage device, an input component, an output component, and a communication interface.

Embodiments may include a non-transitory computer-readable medium (CRM) storing software comprising instructions executable by one or more computers which, upon such execution, cause the one or more computers to perform the disclosed methods. Non-transitory CRM may refer to a CRM that stores data for short periods or in the presence of power such as a memory device or Random Access Memory (RAM). For example, a non-transitory computer-readable medium may include storage devices, such as, a hard disk (e.g., a magnetic disk, an optical disk, a magneto-optic disk, and/or a solid state disk), a compact disc (CD), a digital versatile disc (DVD), a floppy disk, a cartridge, and/or a magnetic tape.

Embodiments may also include one or more computers and one or more storage devices storing instructions that are operable, when executed by the one or more computers, to cause the one or more computers to perform the disclosed methods.

Furthermore, an input component includes a component that permits the device to receive information, such as via user input (e.g., a touch screen display, a keyboard, a keypad, a mouse, a button, a switch, and/or a microphone). Additionally, or alternatively, input components may include a sensor for sensing information (e.g., a global positioning system (GPS) component, an accelerometer, a gyroscope, and/or an actuator). The output component includes a component that provides output information from a device (e.g., a display, a speaker, and/or one or more light-emitting diodes (LEDs)).

A communication interface includes a transceiver-like component (e.g., a transceiver and/or a separate receiver and transmitter) that enables a device to communicate with other devices, such as via a wired connection, a wireless connection, or a combination of wired and wireless connections. The communication interface may permit the device to receive information from another device and/or provide information to another device. For example, a communication interface may include an Ethernet interface, an optical interface, a coaxial interface, an infrared interface, a radio frequency (RF) interface, a universal serial bus (USB) interface, a Wi-Fi interface, a cellular network interface, and/or the like.

Software instructions may be read into memory and/or storage devices from another computer-readable medium or from another device via communication interface. When executed, software instructions stored in memory and/or storage device may cause processor to perform one or more processes described herein. Additionally, or alternatively, hardwired circuitry may be used in place of or in combination with software instructions to perform one or more processes described herein. Thus, implementations described herein are not limited to any specific combination of hardware circuitry and software.

In some implementations, a policy management service may be hosted in a cloud computing environment. Notably, while implementations described herein describe a policy management service as being hosted in cloud computing environment, in some implementations, a policy management service may not be cloud-based (i.e., may be implemented outside of a cloud computing environment) or may be partially cloud-based.

Cloud computing environment can include, for example, an environment that hosts the policy management service. The cloud computing environment may provide computation, software, data access, storage, etc. services that do not require end-user knowledge of a physical location and configuration of system(s) and/or device(s) that hosts the policy management service. For example, a cloud computing environment may include a group of computing resources (referred to collectively as "computing resources" and individually as "computing resource").

Computing resources includes one or more personal computers, workstation computers, server devices, or other types of computation and/or communication devices. In some implementations, computing resources may host the policy management service. The cloud resources may include compute instances executing in computing resource, storage devices provided in computing resource, data transfer devices provided by computing resource, etc. In some implementations, computing resource may communicate with other computing resources via wired connections, wireless connections, or a combination of wired and wireless connections. In some embodiments, a computing resource includes a group of cloud resources, such as one or more applications ("APPs"), one or more virtual machines ("VMs"), virtualized storage ("VSs"), one or more hypervisors ("HYPs"), and/or the like.

Application includes one or more software applications that may be provided to or accessed by user devices. Application may eliminate a need to install and execute the software applications on a user device. For example, an application may include software associated with the policy management service and/or any other software capable of being provided via a cloud computing environment, while in some embodiments, other applications are provided via virtual machines. A virtual machine can include a software implementation of a machine (e.g., a computer) that executes programs like a physical machine. A virtual machine may be either a system virtual machine or a process virtual machine, depending upon use and degree of correspondence to any real machine by virtual machine. A system virtual machine may provide a complete system platform that supports execution of a complete operating system ("OS"). A process virtual machine may execute a single program, and may support a single process. In some embodiments, virtual machines may execute on behalf of a user (e.g., a user of user device or an administrator of the policy management service), and may manage infrastructure of cloud computing environment, such as data management, synchronization, or long-duration data transfers.

Virtualized storage includes one or more storage systems and/or one or more devices that use virtualization techniques within the storage systems or devices of computing resources. In some embodiments, within the context of a storage system, types of virtualizations may include block virtualization and file virtualization. Block virtualization may refer to abstraction (or separation) of logical storage from physical storage so that the storage system may be accessed without regard to physical storage or heterogeneous structure. The separation may permit administrators of the storage system flexibility in how the administrators manage storage for end users. File virtualization may eliminate dependencies between data accessed at a file level and a location where files are physically stored. This may enable optimization of storage use, server consolidation, and/or performance of non-disruptive file migrations.

Hypervisors may provide hardware virtualization techniques that allow multiple operating systems (e.g., "guest operating systems") to execute concurrently on a host computer, such as a computing resource. Hypervisors may present a virtual operating platform to the guest operating systems, and may manage the execution of the guest operating systems. Multiple instances of a variety of operating systems may share virtualized hardware resources.

A network includes one or more wired and/or wireless networks. For example, networks may include a cellular network (e.g., a fifth generation (5G) network, a long-term evolution (LTE) network, a third generation (3G) network, a code division multiple access (CDMA) network, etc.), a public land mobile network (PLMN), a local area network (LAN), a wide area network (WAN), a metropolitan area network (MAN), a telephone network (e.g., the Public Switched Telephone Network (PSTN)), a private network, an ad hoc network, an intranet, the Internet, a fiber optic-based network, and/or the like, and/or a combination of these or other types of networks.

An "interface" may be understood to refer to a mechanism for communicating content through a client application to an application user. In some examples, interfaces may include pop-up windows that may be presented to a user via native application user interfaces (UIs), controls, actuatable interfaces, interactive buttons or other objects that may be shown to a user through native application UIs, as well as mechanisms that are native to a particular application for presenting associated content with those native controls. In addition, the terms "actuation" or "actuation event" refers to an event (or specific sequence of events) associated with a particular input or use of an application via an interface, which can trigger a change in the display of the application. Furthermore, a "native control" refers to a mechanism for communicating content through a client application to an application user. For example, native controls may include actuatable or selectable options or "buttons" that may be presented to a user via native application UIs, touch-screen access points, menus items, or other objects that may be shown to a user through native application UIs, segments of a larger interface, as well as mechanisms that are native to a particular application for presenting associated content with those native controls. The term "asset" refers to content that may be presented in association with a native control in a native application. As some non-limiting examples, an asset may include text in an actuatable pop-up window, audio associated with the interactive click of a button or other native application object, video associated with a user interface, or other such information presentation.

In addition to the algorithms and techniques described above, one or more of the following techniques may be utilized by one or more of the disclosed embodiments: RPA, Mongo DB, Artificial Intelligence (AI) Modules such as Python, Image to Text, OCR, Computer Vision, Image comparison (phase comparison), Image Validation (image to text, then text to text comparison), Learning Algorithms, Similarity Analytics, Sequencing algorithms, Random Forest, graph Convolutional Neural Networks (gCNN), Data Clustering with weighted data, Data Visualization, Rocket Chat, and D3JS.

For purposes of the current description, the terms "organization," "client," "organization resources," or "client resources" refer to database resources (i.e., data, metadata, programs, and other resources) that are maintained in a central multi-tenant database for access by users who have appropriate access privileges. Such resources will generally be managed by a server and data storage system maintained by a platform provider, as opposed to computers within the actual client (tenant) businesses themselves. In addition, a Cloud Service Provider (CSP) may include an organization that provides a cloud computing resource to a client device and/or a user of a client device. Furthermore, the term "component" refers to software applications and other system modules and features comprising or supporting the multi-tenant architecture.

The methods, devices, processing, circuitry, and logic described above may be implemented in many different ways and in many different combinations of hardware and software. For example, all or parts of the implementations may be circuitry that includes an instruction processor, such as a Central Processing Unit (CPU), microcontroller, or a microprocessor; or as an Application Specific Integrated Circuit (ASIC), Programmable Logic Device (PLD), or Field Programmable Gate Array (FPGA); or as circuitry that includes discrete logic or other circuit components, including analog circuit components, digital circuit components or both; or any combination thereof. The circuitry may include discrete interconnected hardware components or may be combined on a single integrated circuit die, distributed among multiple integrated circuit dies, or implemented in a Multiple Chip Module (MCM) of multiple integrated circuit dies in a common package, as examples.

Accordingly, the circuitry may store or access instructions for execution, or may implement its functionality in hardware alone. The instructions may be stored in a tangible storage medium that is other than a transitory signal, such as a flash memory, a Random Access Memory (RAM), a Read Only Memory (ROM), an Erasable Programmable Read Only Memory (EPROM); or on a magnetic or optical disc, such as a Compact Disc Read Only Memory (CDROM), Hard Disk Drive (HDD), or other magnetic or optical disk; or in or on another machine-readable medium. A product, such as a computer program product, may include a storage medium and instructions stored in or on the medium, and the instructions when executed by the circuitry in a device may cause the device to implement any of the processing described above or illustrated in the drawings.

The implementations may be distributed. For instance, the circuitry may include multiple distinct system components, such as multiple processors and memories, and may span multiple distributed processing systems. Parameters, databases, and other data structures may be separately stored and managed, may be incorporated into a single memory or database, may be logically and physically organized in many different ways, and may be implemented in many different ways.

Example implementations include linked lists, program variables, hash tables, arrays, records (e.g., database records), objects, and implicit storage mechanisms. Instructions may form parts (e.g., subroutines or other code sections) of a single program, may form multiple separate programs, may be distributed across multiple memories and processors, and may be implemented in many different ways. Example implementations include stand-alone programs, and as part of a library, such as a shared library like a Dynamic Link Library (DLL). The library, for example, may contain shared data and one or more shared programs that include instructions that perform any of the processing described above or illustrated in the drawings, when executed by the circuitry.

While various embodiments of the invention have been described, the description is intended to be exemplary, rather than limiting, and it will be apparent to those of ordinary skill in the art that many more embodiments and implementations are possible that are within the scope of the invention. Accordingly, the invention is not to be restricted except in light of the attached claims and their equivalents. Also, various modifications and changes may be made within the scope of the attached claims.

We claim:

1. A method for providing reasoning for decisions made by an artificial intelligence (AI) system, the method comprising:

assigning, at the AI system, a first label to a first data item of a plurality of data items, wherein the AI system comprises a plurality of components including a metadata module, a questionnaire module, a domain data and model knowledge module, a recommendation module and an array of explainability components, wherein each of the plurality of components communicate with each other over a network, and wherein the explainability components comprise a causal graph, support vector data samples, and an explainability classifier;

associating, at the AI system, using the metadata module, a first metadata to the first data item, the first metadata explaining the first label was assigned to the first data item because the first data item includes a first feature;

receiving, at the AI system, using the questionnaire module, a first query involving a second data item;

determining, at the AI system, the second data item includes a second feature that matches the first feature;

assigning, at the AI system and in response to the second feature matching the first feature, the first label to the second data item;

determining characteristics of the AI system based on an explainability questionnaire dataset;

processing, using the recommendation module of the AI system, the explainability questionnaire dataset to identify a plurality of explainability methods including one or more data-specific explainability methods and one or more model-specific explainability methods;

processing, using the domain data and model knowledge module of the AI system, the explainability questionnaire dataset to identify a historical summary of the plurality of explainability methods;

selecting, by the AI system, at least one explainability method among the plurality of explainability methods for the AI system in a ranked order based on the determined characteristics of the AI system, the one or more data-specific explainability methods, the one or more model-specific explainability methods, and the historical summary, wherein the recommendation module implements a recommendation model to use a questionnaire to create a ranked list of the plurality of explainability methods as explainability options for the AI system in the ranked order;

generating, by the AI system, a first content describing the first metadata using the selected at least one explainability method, wherein generating the first content comprises:

receiving, at the AI system, a first input identifying a use-case domain for the AI system;

configuring, at the AI system, a format and granularity of the first content based on the first input; and implementing the explainability classifier, an ontology builder, and nearest neighbors algorithms to establish a visual representation of the reasoning for the decision of selecting the at least one explainability method, wherein the visual representation of the reasoning comprises at least one of a general data graph and the causal graph, wherein:

the general data graph is configured to organize the first metadata based on weighted relationships between a plurality of nodes in the recommendation model; and the causal graph is configured to organize the first metadata based on a cause and an effect, wherein each relationship between the cause and the corresponding effect is weighted;

presenting, by the AI system in response to the first query and via a display of a user device, both the first label and the first content describing the first metadata;

receiving, at the AI system, via the display of the user device, a first feedback in response to the presentation of the first label and the first content; and retraining the AI system based on the first feedback.

2. The method of claim 1, wherein the first metadata corresponds to a type of keyword, free text, bounding box, table, timestamp, and trigger action.

3. The method of claim 1, further comprising:

transforming, at the AI system, the first metadata to natural language; and generating, at the AI system, the first content using the natural language.

4. The method of claim 1, further comprising:

receiving, at the AI system, a first response to a first question in the questionnaire; and selecting a first format for the first content based on the first response.

5. The method of claim 1, further comprising:

updating information linked with the first data item based on the first feedback.

6. The method of claim 1, further comprising applying, at the AI system, a labelling algorithm to a third data item of the plurality of data items, thereby propagating the first metadata to additional test samples for the AI system.

7. A non-transitory computer-readable medium storing software comprising instructions executable by one or more computers which, upon such execution, cause the one or more computers to:

assign, at an artificial intelligence (AI) system, a first label to a first data item of a plurality of data items, wherein the AI system comprises a plurality of components including a metadata module, a questionnaire module, a domain data and model knowledge module, a recommendation module and an array of explainability components, wherein each of the plurality of components communicate with each other over a network, and wherein the explainability components comprise a causal graph, support vector data samples, and an explainability classifier;

associate, at the AI system, using the metadata module, a first metadata to the first data item, the first metadata explaining the first label was assigned to the first data item because the first data item includes a first feature;

receive, at the AI system, using the questionnaire module, a first query involving a second data item;

determine, at the AI system, that the second data item includes a second feature that matches the first feature;

assign, at the AI system and in response to the second feature matching the first feature, the first label to the second data item;

determine characteristics of the AI system based on an explainability questionnaire dataset;

process, using the recommendation module of the AI system, the explainability questionnaire dataset to identify a plurality of explainability methods including one or more data-specific explainability methods and one or more model-specific explainability methods;

processing, using the domain data and model knowledge module of the AI system, the explainability questionnaire dataset to identify a historical summary of the plurality of explainability methods;

select, by the AI system, at least one explainability method among the plurality of explainability methods for the AI system in a ranked order based on the determined characteristics of the AI system, the one or more data-specific explainability methods, the one or more model-specific explainability methods, and the historical summary, wherein the recommendation module implements a recommendation model to use a questionnaire to create a ranked list of the plurality of explainability methods as explainability options for the AI system in the ranked order;

generate, by the AI system, a first content describing the first metadata using the selected at least one explainability method, wherein to generate the first content, the one or more computers are configured to:

receive, at the AI system, a first input identifying a use-case domain for the AI system;

configure, at the AI system, a format and granularity of the first content based on the first input; and implement, at the AI system, the explainability classifier, an ontology builder, and nearest neighbors algorithms to establish a visual representation of the reasoning for the decision of selecting the at least one explainability method, wherein the visual representation of the reasoning comprises at least one of a general data graph and the causal graph, wherein:

the general data graph is configured to organize the first metadata based on weighted relationships between a plurality of nodes in the recommendation model; and the causal graph is configured to organize the first metadata based on a cause and an effect, wherein each relationship between the cause and the corresponding effect is weighted;

present, by the AI system and in response to the first query, both the first label and the first content describing the first metadata;

receive, at the AI system, via the display of the user device, a first feedback in response to the presentation of the first label and the first content; and retrain the AI system based on the first feedback.

8. The non-transitory computer-readable medium storing software of claim 7, wherein the first metadata corresponds to a type of keyword, free text, bounding box, table, timestamp, and trigger action.

9. The non-transitory computer-readable medium storing software of claim 7, wherein the instructions further cause the one or more computers to:

transform, at the AI system, the first metadata to natural language; and generate, at the AI system, the first content using the natural language.

10. The non-transitory computer-readable medium storing software of claim 7, wherein the instructions further cause the one or more computers to:

receive, at the AI system, a first response to a first question in the questionnaire;

and select a first format for the first content based on the first response.

11. The non-transitory computer-readable medium storing software of claim 7, wherein the instructions further cause the one or more computers to:

update information linked with the first data item based on the first feedback.

12. The non-transitory computer-readable medium storing software of claim 11, wherein the instructions further cause the one or more computers to apply, at the AI system, a labeling algorithm to a third data item of the plurality of data items, thereby propagating the first metadata to additional test samples for the AI system.

13. A system for providing reasoning for decisions made by an artificial intelligence (AI) system, the system comprising one or more computers and one or more storage devices storing instructions that are operable, when executed by the one or more computers, to cause the one or more computers to:

assign, at the AI system, a first label to a first data item of a plurality of data items, wherein the AI system comprises a plurality of components including a metadata module, a questionnaire module, a domain data and model knowledge module, a recommendation module and an array of explainability components, wherein each of the plurality of components communicate with each other over a network, and wherein the explainability components comprise a causal graph, support vector data samples, and an explainability classifier;

associate, at the AI system, using the metadata module, a first metadata to the first data item, the first metadata explaining the first label was assigned to the first data item because the first data item includes a first feature;

receive, at the AI system, using the questionnaire module, a first query involving a second data item;

determine, at the AI system, that the second data item includes a second feature that matches the first feature;

assign, at the AI system and in response to the second feature matching the first feature, the first label to the second data item;

determine characteristics of the AI system based on an explainability questionnaire dataset;

process, using the recommendation module of the AI system, the explainability questionnaire dataset to identify a plurality of explainability methods including one or more data-specific explainability methods and one or more model-specific explainability methods;

processing, using the domain data and model knowledge module of the AI system, the explainability questionnaire dataset to identify a historical summary of the plurality of explainability methods;

select, by the AI system, at least one explainability method among the plurality of explainability methods for the AI system in a ranked order based on the determined characteristics of the AI system, the one or more data-specific explainability methods, the one or more model-specific explainability methods, and the historical summary, wherein the recommendation module implements a recommendation model to use a questionnaire to create a ranked list of the plurality of explainability methods as explainability options for the AI system in the ranked order;

generate, by the AI system, a first content describing the first metadata using the selected at least one explainability method, wherein to generate the first content, the one or more computers are configured to:

receive, at the AI system, a first input identifying a use-case domain for the AI system;

configure, at the AI system, a format and granularity of the first content based on the first input; and implement, at the AI system, the explainability classifier, an ontology builder, and nearest neighbors algorithms to establish a visual representation of the reasoning for the decision of selecting the at least one explainability method, wherein the visual representation of the reasoning comprises at least one of a general data graph and the causal graph, wherein:

the general data graph is configured to organize the first metadata based on weighted relationships between a plurality of nodes in the recommendation model; and the causal graph is configured to organize the first metadata based on a cause and an effect, wherein each relationship between the cause and the corresponding effect is weighted;

present, by the AI system and in response to the first query, both the first label and the first content describing the first metadata;

receive, at the AI system, via the display of the user device, a first feedback in response to the presentation of the first label and the first content; and retrain the AI system based on the first feedback.

14. The system of claim 13, wherein the first metadata corresponds to a type of keyword, free text, bounding box, table, timestamp, and trigger action.

15. The system of claim 13, wherein the instructions further cause the one or more computers to:

transform, at the AI system, the first metadata to natural language; and generate, at the AI system, the first content using the natural language.

16. The system of claim 13, wherein the instructions further cause the one or more computers to:

receive, at the AI system, a first response to a first question in the questionnaire; and select a first format for the first content based on the first response.

17. The system of claim 13, wherein the instructions further cause the one or more computers to:

update information linked with the first data item based on the first feedback.

* * * * *